United States Patent [19]

Wilkerson

[11] Patent Number: 4,845,594
[45] Date of Patent: Jul. 4, 1989

[54] RECLOSING RELAY WITH NONVOLATILE MEMORY OF OPERATIONS

[75] Inventor: Timothy M. Wilkerson, Madison County, Ill.

[73] Assignee: Basler Electric Company, Highland, Ill.

[21] Appl. No.: 129,381

[22] Filed: Nov. 24, 1987

Related U.S. Application Data

[63] Continuation of Ser. No. 881,181, Jul. 1, 1986, abandoned.

[51] Int. Cl.$^4$ ............................................. H02N 3/08
[52] U.S. Cl. ...................................... 361/71; 361/74; 361/96; 364/480; 364/483
[58] Field of Search ................. 364/480, 483; 361/71, 361/72, 73, 74, 75, 93, 94, 95, 96, 97, 98, 100, 101

[56] References Cited

U.S. PATENT DOCUMENTS

| | | | |
|---|---|---|---|
| 3,471,749 | 10/1969 | Harris | 317/23 |
| 3,560,798 | 2/1971 | Tenebaum et al. | 361/73 X |
| 3,757,302 | 9/1973 | Pollitt | 361/71 X |
| 3,801,872 | 4/1974 | Zocholl et al. | 361/73 X |
| 3,878,436 | 4/1975 | Bogel | 317/22 |
| 4,331,999 | 5/1982 | Engel et al. | 361/94 |
| 4,463,401 | 7/1984 | Grenier et al. | 361/72 X |
| 4,477,856 | 10/1984 | DePuy | 361/72 |
| 4,535,409 | 8/1985 | Jindrick et al. | 361/71 X |
| 4,587,590 | 5/1986 | Bala et al. | 361/94 |
| 4,604,674 | 8/1986 | Hamel | 361/73 |
| 4,680,706 | 7/1987 | Bray | 364/492 |

OTHER PUBLICATIONS

"BE1-79 Multiple Shot Reclosing Relay", Basler Electric, 5/77, 4 pages.

"Reclosing Relays", General Electric, 30 pages, dated in 1982, 1983.

*Microcomputer Primer*, Waite and Pardee, 1983, pp. 40–41, 77, 79–83, 128–133, 191.

*Webster's New World Dict. of Computer Terms*, 1983, Simon & Schuster, Inc., p. 129.

*McGraw-Hill Dict. of Scientific & Tech. Terms*, 1984, p. 570.

*IEEE Standard Dict. of Elec. & Electronics Terms*, 3rd Ed., 1984, pp. 328, 821.

*Primary Examiner*—A. D. Pellinen
*Assistant Examiner*—H. L. Williams
*Attorney, Agent, or Firm*—Senniger, Powers, Leavitt and Roedel

[57] ABSTRACT

A reclosing relay for use in an electrical power system with a circuit breaker for clearing line faults by tripping and reclosing. The breaker has auxiliary contacts defining the state of the circuit breaker as open or closed. The reclosing relay includes a circuit responsive to the auxiliary contacts for producing a first signal representative of the state of the breaker and another circuit for generating a second signal when a loss of power to the reclosing relay is anticipated. The reclosing relay further includes an electronic circuit connected to the first signal producing circuit and the second signal generating circuit for supplying a reclose command for the breaker when the breaker is open by executing one or more operations in a predetermined reclosing sequence, for storing information in response to the second signal identifying which operation in the reclosing sequence is currently being executed, and for using the stored information to continue from the identified operation in the reclosing sequence upon restoration of power. Other features of reclosing relays and methods of operating them are also disclosed.

45 Claims, 17 Drawing Sheets

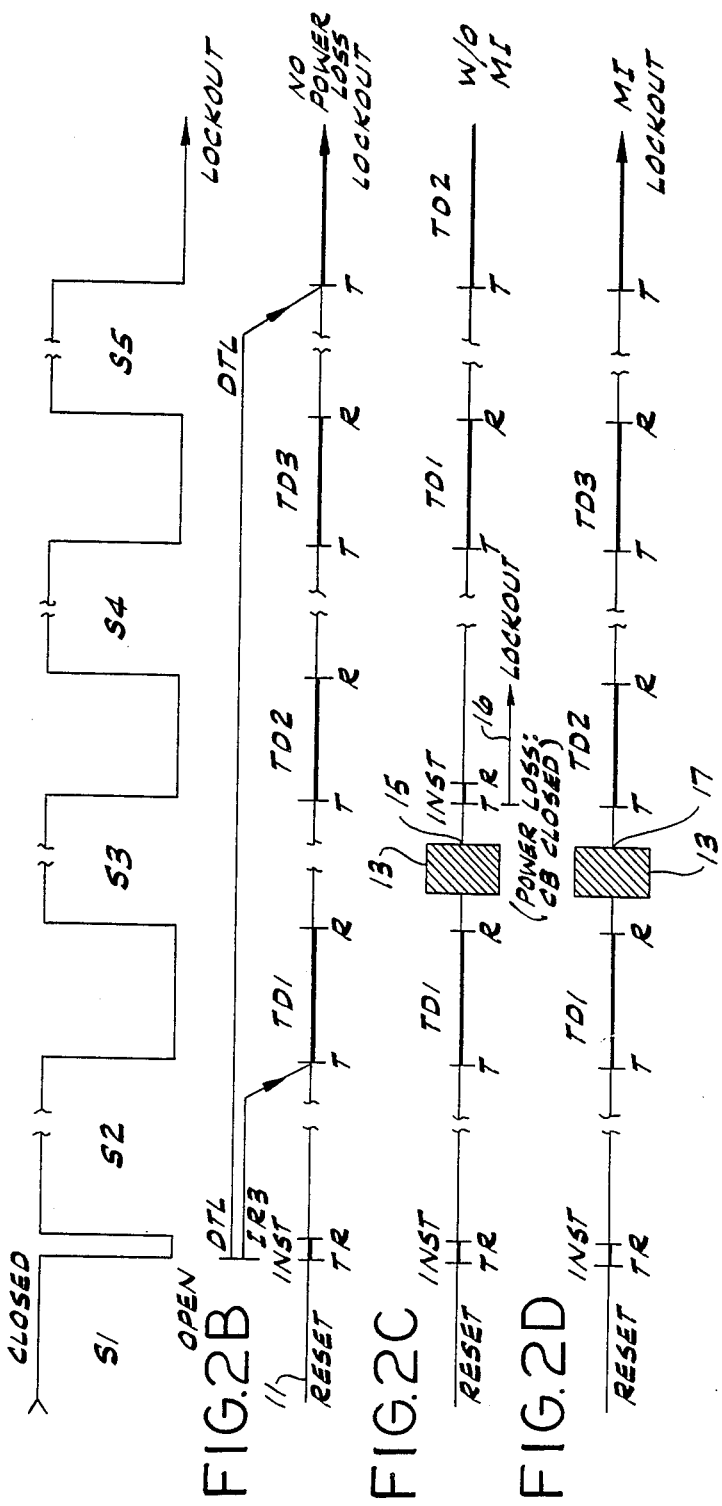

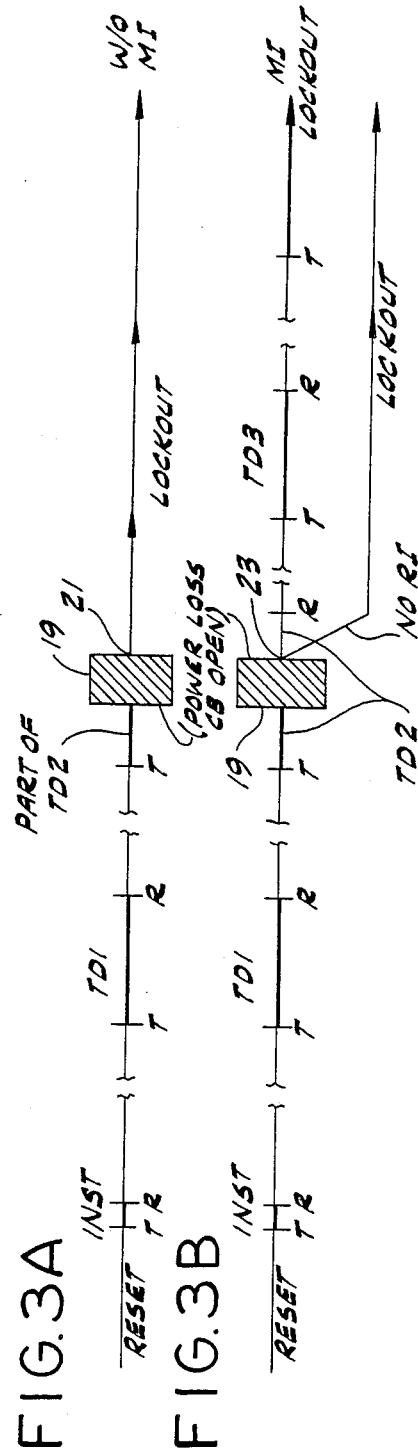

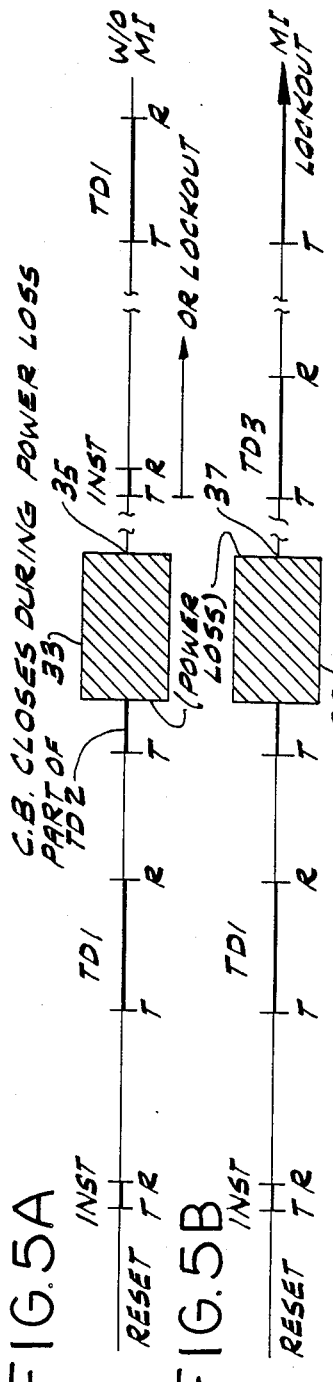

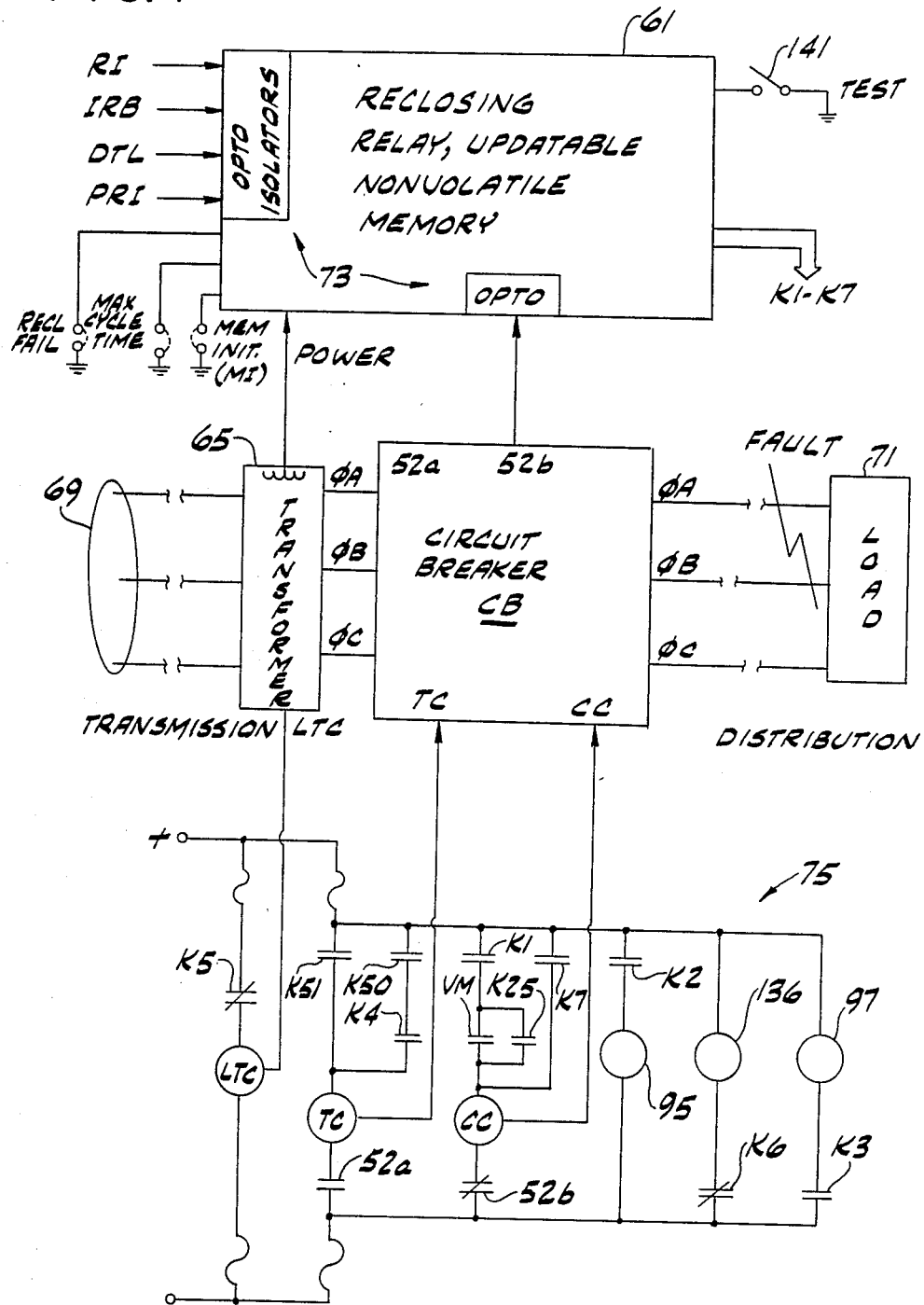

SUMMARY FLOWCHART

FIG. 15 POWER UP AND MI 503

FIG.16 RESET TIMING AND LOCKOUT

RECLOSE AND PILOT OUTPUTS 509

CHECK ROUTINE

TESTOT
(REM QUERY)

822

RECLOSING RELAY WITH NONVOLATILE MEMORY OF OPERATIONS

CROSS-REFERENCE TO RELATED APPLICATION

This application is a continuation of coassigned, copending application Ser. No. 881,181 for "Reclosing Relays and Methods" filed July 1, 1986.

NOTICE

Copyright © 1986 Basler Electric Company. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to improved relays and methods for controlling the operation of a power circuit breaker in electrical power transmission and distribution systems. In particular, the present invention relates to reclosing relays for closing and reclosing a power circuit breaker and methods of operation of reclosing relays.

The majority of faults on overhead electric power lines, such as those with heavy tree exposure, are cleared by momentarily de-energizing the line. The momentary power cutoff is accomplished by the circuit breaker, which is opened or tripped by an overload relay when an overload due to a fault is sensed. The condition of the breaker as open or closed is defined by auxiliary "52a" and "52b" contacts on the breaker. The 52a contact is closed only when the breaker is closed, and the 52b contact is closed only when the breaker is open.

Automatically reclosing the breaker, after the fault clears, provides improved system stability and electric service continuity for the consumer. This, in turn, allows higher line loading by decreasing the likelihood of line loss.

The circuit that issues one or more commands (signals) to close the breaker is called a reclosing relay. The term "reclosing relay" as used in the electric power system art refers to a relatively complicated apparatus instead of a mere coil-and-contact device often called a "relay" in other contexts. The breaker may close once in response to the reclosing relay but then be tripped open again by the overload relay or other relay after a short time. In such case it may be desirable for the reclosing relay to reclose the breaker again. A multi-shot reclosing relay can supply a reclose command signal to the circuit breaker more than once in a reclosing sequence. Each issuance of the reclosing command signal is called an "attempt" or "shot". If the breaker is continually being tripped open, the multi-shot reclosing relay will discontinue and prevent further automatic reclosing of the breaker and leave the breaker open. This condition is called "lock-out".

Where most faults are attributable to heavy tree exposure, as in distribution networks, multiple reclosure attempts are common. This is because of low voltage levels, and is desirable considering customer inconvenience during outages.

On distribution and subtransmission networks, it is desirable to delay reclosing to allow motors to drop off and local generators to be separated. On the other hand, faster reclosing in transmission systems minimizes damage and system shock.

Without limiting the scope of applications intended for the invention, one area of its use is now further discussed in the context of the distribution field.

In distribution substations, electric power at a high transmission voltage passes through a stepdown transformer to a distribution bus for distribution to customers at a lower voltage. A circuit breaker is connected on the distribution side of the transformer, and the reclosing is typically thus effected at distribution voltages. Operating power for the substation itself, including protective relays such as overload relays and reclosing relays, is either taken off the transformer through a tertiary winding on the transformer or derived directly from the distribution bus through a separate transformer. There frequently is no back up secure source of power for the substation such as a battery or generator set because of the expense of maintaining them. However, a power outage is not unlikely during a thunderstorm or other fault-producing condition. At such times power can be lost on the transmission side of the substation transformer, just when reclosing operations may be underway in the reclosing relay.

In the prior art, electromechanical reclosing relays have used a synchronous motor with a cam-operated stepping switch arrangement. Electromechanical reclosing relays are expensive and require tedious adjustments in manufacture. Moreover, the operating sequence and timing of electromechanical reclosing relay cannot be readily modified. These problems have led the art to consider some type of electronic reclosing relay arrangement. The electronic reclosing relay approach, however, has hitherto lacked the ability inherent in the electromechanical reclosing relay to recover gracefully from a power outage. (The motor and associated cams and switches of an electromechanical reclosing relay merely stop in place when power is lost, and then resume where they left off in their reclosing operations when power is restored.)

Manifestly, an improved electronic reclosing relay is needed which can be readily adjusted to any desired operating sequence and timing, including both normal and pilot reclose sequences, and which emulates the ability of the electromechanical reclosing relay to retain its position upon power loss during a reclosing operation. Transmission and underground environments present problems analogous to the problems in the distribution environment discussed above. A reclosing relay which is equally applicable to each environment is desirable.

As noted above, electromechanical relays lack flexibility of adjustment. For example, by virtue of their construction, they have an inherent maximum reclosing cycle time which is equal to the revolution time of a camshaft therein. This maximum cycle time may be much longer than the average cycle time that would actually elapse in most fault situations.

The just-noted discrepancy between maximum cycle time and average actual cycle time is a practical problem because of the need of the public and safety personnel to assist injured person (as in an auto accident under a downed power line) as soon as possible. Assistance cannot be safely given unless it is substantially certain that power is removed from the line, i.e. that the maximum cycle time is predictable and has elapsed. Insurance premiums that utilities pay may vary considerably depending on what maximum cycle time their reclosing relays actually have.

Also, where the maximum required cycle time depends on electrical network considerations, the inherent inflexibility of electromechanical reclosing relays forces the utility to carry extra stocks of reclosing relays and requires extra time of utility personnel to identify specific relays for specific locations. An improved reclosing relay is therefore needed which has an adjustable maximum cycle time. In this way improved safety for the public and more economical utility operations can be realized.

Establishing proper reclosing sequences and time interval values for reclosing relays poses a further difficult problem. When the proper sequences and time values are established, unsuccessful reclosures are minimized and reliable availability of electric power for the consuming public is enhanced. Ordinarily, studies by the utility are used as guidelines for the purpose. However, such studies can require expensive equipment and unduly consume expensive personnel time. Test reclosures of breakers during maintenance may constitute data which is irrelevant to a study of reclosing under fault and other conditions. It is therefore difficult to collect reliable data on which to establish time delay values in reclosing relays. There is a need for some convenient improved way of gathering meaningful data on the operations of reclosing relays with minimal equipment addition and burden on personnel.

SUMMARY OF THE INVENTION

Among the objects of the present invention are to provide improved reclosing relays and methods which involve self-monitoring; to provide improved electronic reclosing relays and methods which emulate the ability of the electromechanical reclosing relay to retain its position in sequence after a loss of operating power; to provide improved electronic reclosing relays and methods which have a maximum cycle time that is more predictable and nearer to an average cycle time expected of the relay; to provide improved reclosing relays and methods for accumulating data on one or more types of reclosing operations; to provide improved reclosing relays and methods which display accumulated data on reclosing operations in a way that reuses hardware otherwise used in displaying reclosing operations; and to provide improved reclosing relays and methods which are economical and reliable.

Generally, one form of the invention involves a reclosing relay for use in an electrical power system with a circuit breaker for clearing line faults by tripping and reclosing, the breaker having auxiliary contacts defining the state of the circuit breaker as open or closed. The reclosing relay includes a circuit responsive to the auxiliary contacts for producing a first signal representative of the state of the breaker and another circuit for generating a second signal when a loss of power to the reclosing relay is anticipated. The reclosing relay further includes an electronic circuit connected to the first signal producing circuit and the second signal generating circuit for supplying a reclose command for the breaker when the breaker is open by executing one or more operations in a predetermined reclosing sequence, for storing information in response to the second signal identifying which operation in the reclosing sequence is currently being executed, and for using the stored information to continue from the identified operation in the reclosing sequence upon restoration of power.

A method form of the invention involves the steps of electronically supplying a reclose command for the breaker when the breaker is open by executing one or more operations in a predetermined reclosing sequence, storing information identifying which operation in the reclosing sequence is currently being executed when a loss of power to the reclosing relay is anticipated, and using the stored information to electronically continue from the identified operation in the reclosing sequence upon restoration of power.

In general, another form of the invention involves a reclosing relay including the first signal producing circuit and the second signal generating circuit combined with an electronic circuit connected to the first signal producing circuit and the second signal generating circuit for supplying a reclose command for the breaker when the breaker is open by executing one or more operations in a predetermined reclosing sequence and for storing in nonvolatile form a running count of the number of occurrences over time of a particular operation in the reclosing sequence.

Another method form of the invention involves the steps of electronically supplying a reclose command for the breaker when the breaker is open by executing one or more operations in a predetermined reclosing sequence, electronically counting the number of occurrences over time of a particular operation in the reclosing sequence, and storing and updating in nonvolatile form the number so counted.

In general, a further form of the invention involves a reclosing relay including the first signal producing circuit combined with an electronic circuit connected to the first signal producing circuit for supplying a reclose command for the breaker when the breaker is open by executing one or more operations in a reclosing sequence having a time delay and for supplying a lockout signal if the operations are not completed within a predetermined time period after the breaker is initially tripped. Also included is means for establishing the predetermined time period for the electronic circuit independently of the time delay in the reclosing sequence.

A further method form of the invention is a method of operating a reclosing relay that has first and second indicators and means for adjustably establishing and indicating a time interval between operations of a reclosing sequence. The method includes the steps of electronically supplying a reclose command for the breaker when the breaker is open be executing one or more operations in the reclosing sequence, electronically counting the number of occurrences over time of a particular operation in the reclosing sequence, and activating the first indicator or the second indicator depending on whether a number, indicated by the means for adjustably establishing and indicating, is respectively at least or at most equal to the number electronically counted.

A further method form of the invention includes the steps of electronically supplying a reclose command for the breaker when the breaker is open by executing one or more operations in a reclosing sequence having a time delay, electronically supplying a lockout signal if the operations are not completed within a predetermined time period after the breaker is initially tripped, and electronically establishing the predetermined time period independently of the time delay in the reclosing sequence.

Other objects and features will be in part apparent and in part pointed out hereinafter.

BRIEF DESCRIPTION OF THE DRAWINGS

FIG. 2A is a diagram showing the state of a circuit breaker as a reclosing sequence progresses;

FIG. 2B is a linear diagram of a reclosing sequence corresponding to states of the circuit breaker in FIG. 2A;

FIG. 2C is a linear diagram of a reclosing sequence with a power loss and without an inventive memory initiate feature;

FIG. 2D is a linear diagram of a reclosing sequence with the inventive memory initiate feature and power loss;

FIG. 3A is another linear diagram of a reclosing sequence with a power loss and without the memory initiate feature;

FIG. 3B is another linear diagram of a reclosing sequence with the inventive memory initiate feature and power loss;

FIG. 4A is another linear diagram of a reclosing sequence with a power loss and without the memory initiate feature;

FIG. 4B is another linear diagram of a reclosing sequence with the inventive memory initiate feature and power loss, showing compensation for a change of breaker state;

FIG. 5A is another linear diagram of a reclosing sequence with a power loss and without the memory initiate feature;

FIG. 5B is another linear diagram of a reclosing sequence with the inventive memory initiate feature and power loss, showing compensation for an opposite change of breaker state;

FIG. 7 is a partially block, partially schematic, diagram of an electrical power system equipped with an inventive reclosing relay operating according to methods of the invention;

FIG. 11 is a memory map for part of a memory in the microcomputer of FIG. 10;

FIG. 12 is a memory map for a nonvolatile memory in FIG. 10 for holding information generated by the microcomputer in the inventive apparatus by the inventive methods;

Corresponding reference characters indicate corresponding parts throughout the several views of the drawings.

DETAILED DESCRIPTION OF PREFERRED EMBODIMENTS

A preferred apparatus embodiment of the inventive reclosing relay operating according to the inventive methods delivers one instantaneous and up to three delayed reclosing attempts with independently-selected time delays. Maximum cycle time is adjustable independently of any of the reclose time delays, and the reclosing relay locks out during a reclosing sequence if the maximum cycle time is exceeded. When a memory initiate (MI) feature is selected by jumper, as illustrated in a circular reclosing sequence diagram of FIG. 1, this reclosing relay does not go back and start over if a power loss occurs during a fault-clearing sequence. Instead, its memory allows the reclosing relay to remember exactly where it was when the power went off and resume in sequence when the power is reapplied.

The reclosing relay blocks operation of tap changing transformers to eliminate unwanted operations until the reclosing relay completes its action in response to a transient fault. Further, the circuitry of the reclosing relay is controllable by other protective relays to bypass instantaneous reclosing and move to a time delayed attempt for close-in faults—effectively overcoming severe transient conditions and reducing current impact on transformers.

If a substation transformer fault occurs, standard electric utility practice trips breakers of both the transmission (high) side and distribution (low) side of the malfunctioning transformer, and a control device at the substation drives the reclosing relay to lockout. When power goes back on, an electromechanical reclosing relay would generally remain in lockout and prevent an undesired automatic reclosure even though the breaker on the distribution side is in an open condition. Therefore, an open breaker is not always interpreted by the inventive electronic reclosing relay upon restoration of power as an occasion for reclosure.

Also, the reclosing relay records each reclosing attempt for later interrogation. No special test equipment is required; the data is displayed on the face of the reclosing relay upon selection of a test mode.

In FIG. 2A the state of the breaker as closed or open is diagrammed as a series of high and low levels alternating as breaker trips are followed by reclosing attempts by the reclosing relay and finally lockout. It is to be understood that is the breaker recloses and is not tripped within a reset time, then the reclosing relay resets itself and returns to the beginning of the sequence, lockout not being inevitable.

Figure 1:
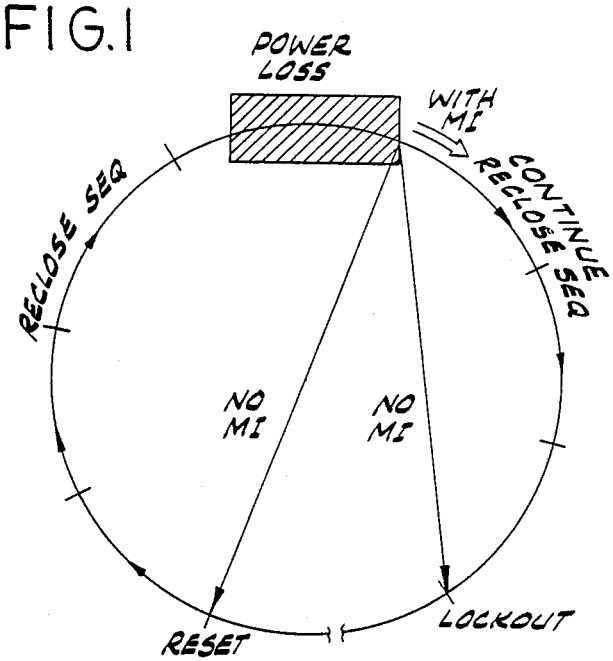
FIG. 1 is a circular diagram of a reclose sequence successfully resumed, in spite of a power loss, by the reclosing apparatus and methods of the invention.

In FIGS. 2B, 2C and 2D, the circular diagram of FIG. 1 is developed into a straight line for illustrating different examples and methods of operation of the reclosing relay of the preferred embodiment.

In FIG. 2B, representing a complete reclosing sequence without a power loss, operations began in a reset state 11. A breaker trip T caused by a fault is followed by a reclose operation R after a negligible period INST representing no intentional time delay in an instantaneous reclose attempt. An indeterminate period of time (but less than a predetermined reset time) illustratively elapses with the breaker closed whence the breaker is again tripped (next T) because the fault is still present. This time the reclosing relay runs a timer to execute a first time delay operation. When a first time period TD1 has elapsed, the reclosing relay executes a reclosing operation R and the breaker again closes for an indeterminate period of time. The breaker is again tripped (T) and the reclosing relay runs a timer to execute a second time delay operation. When a second time period TD2 has elapsed, the reclosing relay executes a reclosing operation R and the breaker again closes for an indeterminate period of time. The breaker is again tripped (T) and the reclosing relay runs a timer to execute a third time delay operation. When a third time period TD3 has elapsed, the reclosing relay executes a reclosing operation R and the breaker again closes for an indeterminate period of time. The breaker is again tripped (T) and the reclosing relay advances to lockout. It is to be understood that a Reclose Initiate signal must be present substantially when the breaker trips each time in order for the reclosing relay to commence an instantaneous reclose or time delayed reclosing attempt. If an instantaneous reclose bypass (IRB) feature is selected by contact input, the first breaker trip is directly followed by time delay TD1 as shown in FIG. 2B. If a drive to lockout (DTL) contact input is received at any time, the reclosing relay 61 immediately advances to lockout.

In FIG. 2C, representing a reclosing sequence without the memory initiate (MI) feature during a power loss, operations begin in the reset state and proceed as in FIG. 2B until a power loss, illustrated by hatched rectangle 13, occurs for example after the first time delayed reclose attempt. Upon restoration of power at point 15, the reclosing relay is reset because its MI feature is disabled. A subsequent trip T of the breaker begins the sequence all over again with an instantaneous reclose, followed by first time delayed reclose TD1, followed by second time delayed reclose TD2, and so on. An arrow 16 indicates that the reclosing relay would go to lockout if the breaker did not in fact remain closed for a predetermined reset time after power is restored. Thus, the interval between point 15 and the next trip T is not shown to scale and must exceed the Reset Time or lockout will occur.

In FIG. 2D, representing a reclosing sequence with the remarkable MI feature electronically responding to a power loss, operations begin in the reset state and proceed as in FIG. 2C until power loss 13 occurs. Upon restoration of power at point 17, however, the reclosing relay is not reset, nor does it time the reset time at point 17, because its MI feature is operating. Instead, the reclosing relay continues by resuming with the same operation of monitoring the breaker state after the first time delayed reclosure that it was executing when power was lost. A subsequent trip T of the breaker starts the second time delayed reclose TD2, and so on. Unnecessary lockout or unintended reclose attempts which might otherwise result from power loss without MI, are advantageously avoided.

In FIG. 3A, representing a reclosing sequence without the MI feature, a power loss 19 occurs while the second reclose time delay TD2 has only partly elapsed. Upon restoration of power at point 21, the reclosing relay locks out because it finds the breaker open and its MI feature is disabled.

In FIG. 3B, representing a reclosing sequence with the MI feature responding to power loss 19, operations proceed as in FIG. 3A until power loss 19 occurs with time delay TD2 only partly elapsed. Upon restoration of power at point 23, however, the reclosing relay does not lock out if a reclose initiate (RI) input is present, because its MI feature is operating. Instead, the reclosing relay remembers how much time is left in the balance of time delay TD2 and makes the second time delayed reclose attempt R when TD2 has timed out. In other words the reclosing relay resumes with the same operation in which it was engaged upon power loss 19. The reclosing sequence continues as discussed in FIG. 2B.

It is noted that the illustrated examples of power loss 13 and power loss 19 involve no change in state of the breaker between loss of power and restoration of power. The MI feature remarkably also takes account of a change of state of the breaker, when it occurs during a power loss, as next discussed.

In FIG. 4A, representing a reclosing sequence with the MI feature disabled, a power loss 25 occurs after the first time delayed reclose attempt while the breaker is thus closed. Upon restoration of power at point 27, the reclosing relay locks out because it finds the breaker open and its MI feature is disabled.

In FIG. 4B, representing a reclosing sequence with the MI feature responding to power loss 25, operations proceed as in FIG. 4A until power loss 25 occurs with the breaker closed. Upon restoration of power at point 29, the reclosing relay finds the breaker open. The reclosing relay does lock out if there remains no reclose initiate RI input signal, see segment 31. However, if the RI signal is present, the MI feature operates to prevent lockout in this example. Instead of locking out, the reclosing relay deduces that time delay TD1 is completed and a reclose has occurred. Therefore, the reclosing relay executes time delay TD2 as shown and makes the second time delayed reclose attempt R when TD2 has timed out.

In other words, when there is a breaker change of state from closed to open during the period of power loss, the reclosing relay continues in the reclosing sequence by immediately proceeding to a next subsequent operation in the sequence after the operation in which it was engaged upon power loss 25. The reclosing sequence continues as discussed in FIG. 2B.

In FIG. 5A, representing a reclosing sequence with the MI feature disabled and a breaker closure during power loss, a power loss 33 occurs during the second time delay TD2 while the breaker is thus open. Upon restoration of power at point 35, the reclosing relay resets because it finds the breaker closed and its MI feature is disabled. The reclosing sequence starts all over again with the instantaneous reclosure if there is a subsequent breaker trip.

In FIG. 5B, representing a reclosing sequence with the MI feature responding to power loss 33, operations proceed as in FIG. 5A until power loss 33 occurs with the breaker open. Upon restoration of power at point 37, the reclosing relay finds the breaker closed. The reclosing relay does not reset. Instead, the reclosing relay regards time delay TD2 as completed and monitors the breaker state for the reset time. If the reset time elapses, the breaker resets, but assuming a trip occurs before then, the reclosing relay proceeds to the third time delay TD3 as shown in FIG. 5B because the same reclosing sequence should continue. In other words, when there is a breaker change of state from open to closed during the period of power loss, the reclosing relay continues in the reclosing sequence by immediately proceeding to the next subsequent operation in the sequence which is reset timing but not necessarily resetting.

Figure 6A:
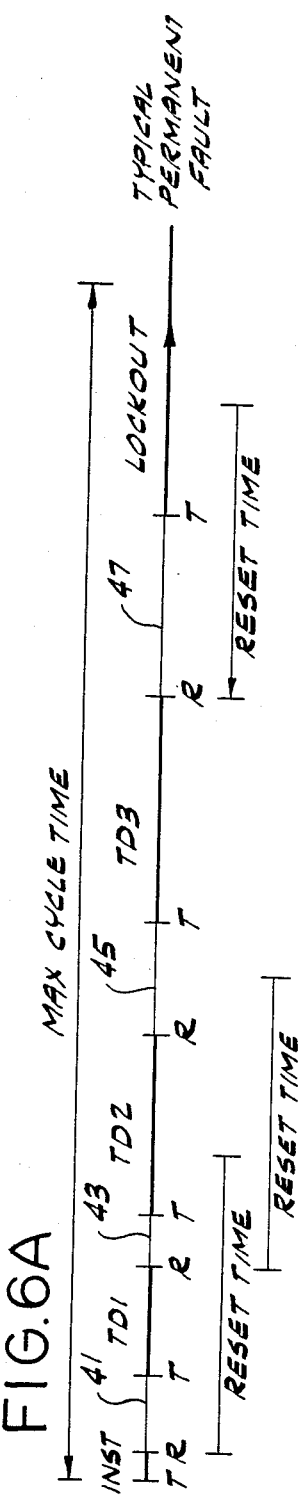
FIG. 6A is another linear diagram of a reclosing sequence with a typical permanent fault.
Figure 6B:
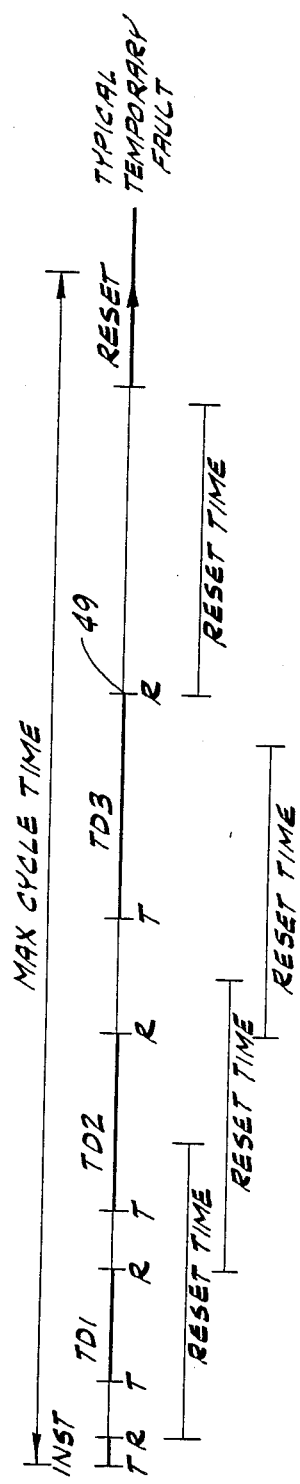
FIG. 6B is another linear diagram of a reclosing sequence with a typical temporary fault.
Figure 6C:
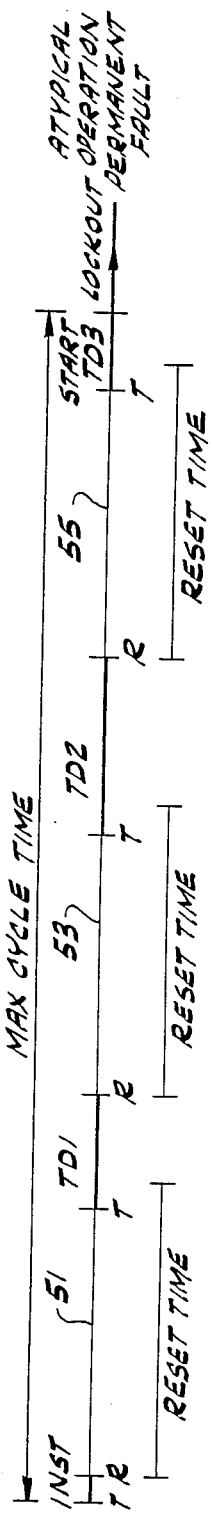
FIG. 6C is another linear diagram of a reclosing sequence with an atypical permanent fault wherein the inventive maximum cycle time apparatus and method are operative.

Next in FIGS. 6A, 6B and 6C the independent maximum cycle time feature is discussed.

In FIG. 6A a typical permanent fault causes an overload relay to trip after relatively short times 41, 43, 45 and 47 after each reclosure, so that the reclosing relay locks out well before a maximum cycle time independently established for the reclosing relay has expired.

In FIG. 6B a typical temporary fault is cleared by reclosing operations R terminating in a successful reclose 49 which is followed by the breaker remaining closed for a period in excess of the reset time. The reclosing relay resets well before the maximum cycle time independently established for the reclosing relay has expired.

In FIG. 6C an atypical high resistance permanent fault occurs. For example, an automobile hits a power pole and a power line breaks and falls onto highway pavement, spitting dangerously. Fault current is released into high impedance or intermittent low impedance. An overload relay trips after relatively long times 51, 53, and 55 and the third time delay period is being timed by the reclosing relay when the maximum cycle time expires. At this point the maximum cycle time consideration, which results from consideration for the welfare of the driver of the car and of emergency personnel takes precedence over continuing the reclose sequence. The reclosing relay interrupts the sequence and locks out because the maximum cycle time independently established for the reclosing relay has expired. In the event of power loss this maximum cycle time would be extended by the duration of the power loss in identical fashion to an electromechanical reclosing relay. However, maximum cycle time in the inventive electronic relay can be more closely tailored to the needs of the particular application.

In FIG. 7 the preferred embodiment multi-shot reclosing relay, which is numbered 61, receives its power from a transformer 65 at a tertiary winding output thereof. Transformer 65 is connected on a high voltage side to a three phase transmission line 69. Transformer 65 is connected on a low voltage side to a circuit breaker CB which, upon occurrence of a fault, interrupts distribution phases A, B and C to a load 71. Circuit breaker CB has a trip coil TC and a closing coil CC which when energized respectively trip the breaker or close it. The fault can often be cleared by appropriately tripping and reclosing the circuit breaker CB one or more times.

Circuit breaker CB has auxiliary contacts 52a which are closed when the breaker is closed. Breaker CB also has auxiliary contacts 52b which are closed when the breaker is open. In FIG. 7 auxiliary contacts 52b are connected to one of five optoisolators 73 in reclosing relay 61, and that optoisolator constitutes means responsive to the auxiliary contacts for producing a first signal representative to the state of the breaker.

Reclosing 61 operates a set of relay contacts K1–K7 which are connected in a network 75 with other protective relay contacts to control circuit breaker CB and transformer 65 to clear the fault and to provide various alarms if necessary.

Figure 8:
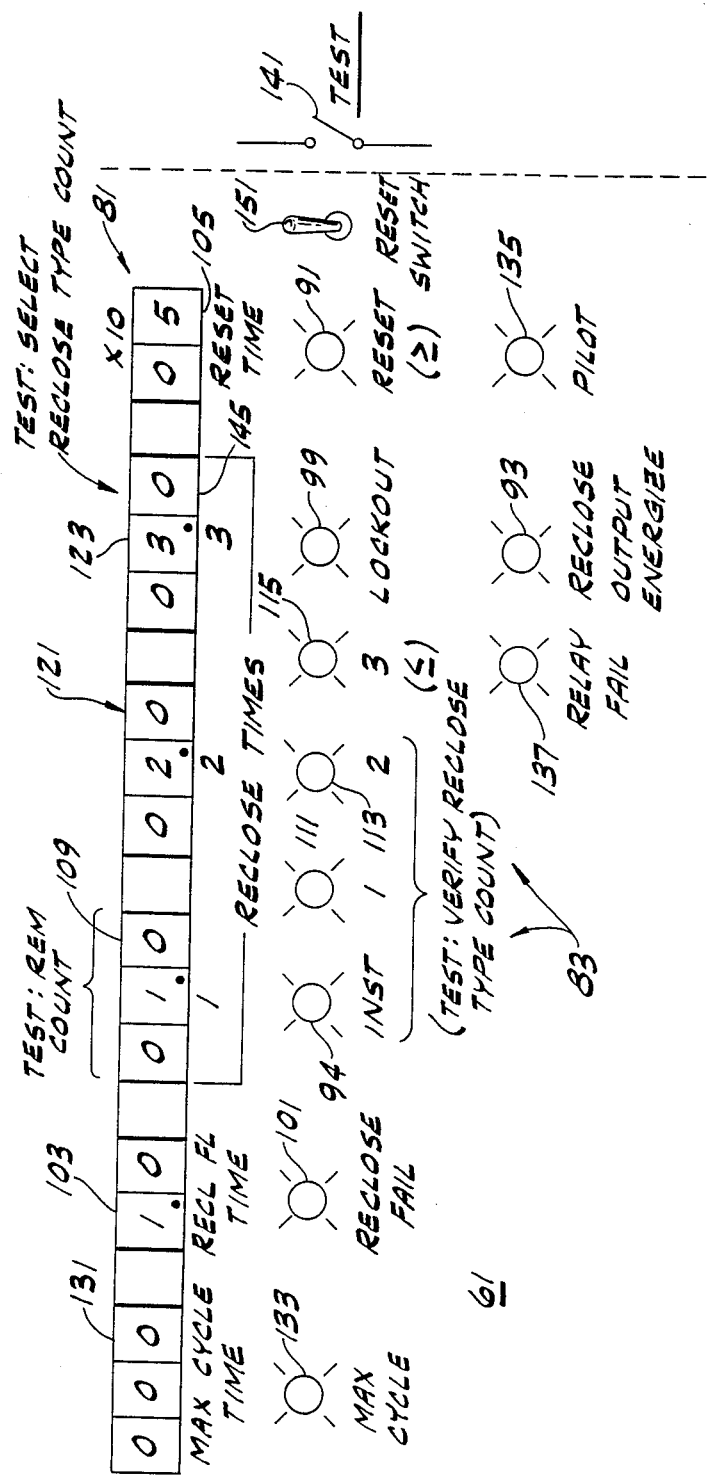
FIG. 8 is a pictorial diagram of part of a panel of the inventive reclosing relay for operation in normal and test modes according to the inventive methods.

The reclosing relay 61 of FIG. 7 acts like many timers, the periods of which can be set by selecting numbers on thumbwheel switches 81 on a front panel as in FIG. 8. The operations of the reclosing relay 61 are displayed on a set of light emitting diode (LED) indicators 83.

An example of operations of reclosing relay 61 with reference to both FIGS. 8 and 7 is now described for further illustration of the use of reclosing relay 61 and of the methods of its operation. Reclosing relay 61 begins in a reset state, and a RESET LED 91 is illuminated. A Reclose Initiate (RI) signal, as from an overcurrent relay, and a 52b breaker open signal occur in FIG. 7. Reclosing relay 61 responds with an instantaneous (no intentional time delay) reclose attempt and turns on a panel LED 93 "Reclose Output Energize". A status LED 94 marked "INST." in FIG. 8 goes on and RESET LED 91 turns off. In network 75 of FIG. 7, reclosing relay 61 closes contacts K1 and energizes breaker closing coil CC when contacts VM (optional voltage monitor for one or both lines dead) or K25 (sync on live lines) or a synchronism check are closed.

If the breaker CB does not close within a settable time period called Reclose Fail Time after a command to reclose has been sent by closing the K1 contacts, the reclosing relay 61 locks out, opens the reclose output contacts and extinguishes the reclose LED. Output contacts K2 close and actuate a lockout alarm 95 of FIG. 7. Also, output contacts K3 close and actuate a reclose fail alarm 97. Correspondingly, a lockout LED 99 and Reclose Fail LED 101 of FIG. 8 are illuminated. Reclose fail time is established by a pair of thumbwheels 103.

The front panel programmable reclose fail time set by thumbwheels 103 limits the duration of the reclose command at relay contacts K1 and LED 93. Initiated at the onset of a reclose command output signal, the reclose fail timing function compares the reclose fail time setting to the time the reclose command signal is present. If the set time on thumbwheels 103 is exceeded before the breaker closes, the relay immediately goes to lockout, the reclose fail output contact K3 is closed, and the reclose fail indicator 101 and lockout LED 99 illuminate. The reclose fail setting is adjustable in 0.1 second increments from 0.1 to 9.9 seconds. Omitting a reclose fail jumper input in FIG. 7 or setting reclose fail time thumbwheels 103 to 00 inhibits the reclose fail timer and causes the reclose command signal to continue as long as the breaker remains open.

However, if the breaker CB does close within the Reclose Fail Time, alarms 95 and 97 and LEDs 99 and 101 are not energized. Instead, the reclosing relay 61 now deenergizes output K1 and LED 93 and proceeds in its operations to wait until the breaker CB is tripped open or for a set-table period called Reset Time, which ever is less. (The reset timing function is also initiated during an initial power-up sequence when breaker CB is closed.) Reset Time is established by a pair of thumbwheels 105. The Reset Time setting is adjustable from 10 to 1000 seconds in 10 second increments and a setting of 00 corresponds to a 1000 second reset time. If the breaker CB remains closed for the entire Reset Time, the reclosing relay 61 automatically resets itself, clears the panel LEDs, and turns on RESET LED 91. Then if the breaker CB is tripped later on, the reclosing relay 61 starts with the instantaneous reclose attempt again.

If the breaker CB is tripped open before the Reset Time elapses, reclosing relay 61 does not reset. Instead, reclosing relay 61 proceeds to the first time delayed reclose attempt and begins timing a first reclose time delay TD1 established and indicated by three thumbwheels 109 in the range 0.1 second to 99.9 seconds. When time delay TD1 times out, output K1 closes, Reclose Output Energize LED 93 is turned on and another LED 111 is turned to display the first time delayed reclose. The reclose fail time begins to run as described above. Assuming the breaker CB closes, LED 93 is turned off, the reclose output is de-energized and the reset time begins to run as also described above. If one or more subsequent trips occur, further status LEDs 113 and 115 are turned on for the second and third time delayed reclose attempts respectively. Time delays TD2 and TD3 for these time delayed attempts are respectively established and indicated by sets 121 and 123 of three thumbwheels each.

In any of the sets of thumbwheels 109, 121 and 123 is set to 000, reclosing relay 61 advances to lockout as soon as the breaker trip preceding the corresponding time delay occurs. Lockout LED 99 is illuminated and LED 93 is turned off. If all of the sets of thumbwheels 109, 121 and 123 define time delays, the reclosing relay 61 only advances to lockout after all programmed reclose attempts have been exhausted and still another breaker trip occurs within the Reset Time.

As discussed above, the three reclose time delays TD1, TD2 and TD3 are provided on thumbwheel switches 109, 121 and 123 for the second, third and fourth reclose attempts. The thumbwheels are individually adjustable in 0.1 second increments from 0.1 to 99.9 seconds. The number of reclosing attempts before lockout is front panel programmable. Setting any of the reclosure time delays to 000 produces lockout when that reclosing attempt is reached in the sequence. If the circuit breaker CB opens during the Reset Time after the first, second or third reclose attempt, the reclosing relay 61 proceeds to the next reclosing attempt, which is a time delayed attempt. Upon completion of the respective reclose time delay, the Reclose output relay K1 and LED 93 are energized and remain on for the length of the reclose fail time setting on thumbwheels 103 or until the breaker closes, whichever is less. The four STATUS LEDs 94, 111, 113 and 115 are illuminated in turn to indicate progression of reclosing sequence. The STATUS LEDs are extinguished on actuation of a front panel reset switch 151. The information of these LEDs is latched in the sense that if an attempt has been made the corresponding LED will remain lit until extinguished by actuation of front panel reset switch 151.

If the reclosing attempts are not successfully completed within a settable period called Maximum Cycle Time, the reclosing relay 61 advances to lockout. Lockout contacts K2 close in FIG. 7 and lockout LED 99 and a Max Cycle LED 133 in FIG. 8 are turned on. The maximum cycle time is adjustable from 1 to 1000 seconds in 1 second increments on a set of three thumbwheels 131. Thumbwheels 131 thus constitute means for establishing a predetermined time period (e.g. maximum cycle time) for the electronic means independently of the time delay in the reclosing sequence. A setting of 000 on thumbwheels 131 is regarded as directing a period of 1000 seconds. Providing a Max Cycle Time jumper in FIG. 7 activates this important feature.

The normally open output contacts K2 close and front panel LED 99 is turned on when lockout occurs. Lockout inhibits further reclosing attempts and occurs upon any of the following conditions:

(1) the number of breaker trips in a sequence exceeds the number of programmed reclosure attempts,
(2) a drive-to-lockout (DTL) input is actuated,
(3) reclose failure occurs, or
(4) the total reclosing sequence time exceeds the maximum cycle time setting.

To bring reclosing relay 61 out of lockout, circuit breaker CB is suitably closed (manually or by other means) and must then remain closed for the duration of the reset time delay established by thumbwheels 105.

The reclosing relay 61 of FIG. 8 provides flexibility of response to minimize inconvenience and system damage when a fault occurs. Contact inputs are provided to select a reclosing sequence, modify a programmed sequence, or cause the relay to go to lockout. These contacts are suitably provided directly from supervisory control, and protection circuits (not shown) external to the reclosing relay 61. For system coordination, the reclosing relay performs automatic system control through outputs K1–K7.

In FIG. 7 some inputs to the reclosing relay are 52*b* (breaker status: open or closed), RI (Reclose Initiate), IRB (Instaneous Reclose Bypass), DTL (Drive to Lock-out), and PRI (Pilot Reclose Initiate). RI signifies that a reclosure of the breaker is externally requested of the reclosing relay to initiate a reclosing sequence consisting of an instantaneous attempt followed by up to three time-delayed attempts. IRB causes the reclosing relay to omit the instantaneous reclose attempt and initiate the reclosing sequence with the first time-delayed reclosing attempt. DTL causes the reclosing relay to lock out until the breaker has been closed by other means and has remained closed for the reset period, whence the reclosing relay resets. DTL signals are typically provided if there is a manual trip, frequency below setpoint, or a major nearby fault needing further investigation.

The reclosing relay can be activated from either PRI or RI. In pilot relaying PRI initiates instantaneous reclosure of a pilot reclose command relay output contact K7 only, followed by up to two time-delayed attempts, and takes priority over IRB and RI but not DTL. A pilot indicator LED 135 is turned on when a pilot reclose sequence is underway.

Pilot relaying involves an external system (not shown) associated with a transmission line that provides high speed simultaneous tripping at both ends of the line when a fault occurs. Non-pilot relaying provides high speed simultaneous protection for most faults in the middle of the line. For faults occurring near one end, overcurrent relays at that end will trip immediately, but overcurrents at the other end will only trip some time later. Pilot relaying trips both ends of the line simultaneously regardless of where the fault occurs thereon. See *Applied Protective Relaying*, Westinghouse 1982, page 16-1.

Reclosing attempts after the instantaneous pilot reclose by reclosing relay 61 in response to a Pilot Relay Initiate PRI are made at the reclose relay output K1 and not at the pilot relay output K7. If the reclosing relay 61 is already in the midst on a non-pilot reclosing sequence, the PRI input is ignored in the present embodiment. PRI can be used to reclose the breaker CB and override voltage-sensing and syncrocheck relays, when such are present. In FIG. 7, for example, the pilot reclose contacts K7 are connected in parallel with the interconnection of contacts K1 with voltage monitor and synchronism check contacts VM and K25.

Jumpers are connected at inputs designated Reclose Fail, Max Cycle Time, and Memory Initiate in FIG. 7 to trigger the corresponding reclosing relay 61 features. In Reclose Fail the reclosing relay can determine whether or not the circuit breaker is responding to a reclose command. In Max Cycle Time an overall time limit for the reclosing cycle is established. In Memory Initiate, the reclosing relay 61 continues from an identified operation in the reclosing sequence after a temporary loss of operating power from transformer 65 by "remembering" that operation which was being performed in the reclosing cycle when power was lost.

The reclosing relay 61 of FIG. 7 can drive seven output relays, three of which can supply commands to the circuit breaker: Reclose Output K1, Pilot K7, and Instantaneous Trip K4. The Reclose Output K1 is the main output for reclosing the circuit breaker CB. Pilot K7 is the output for the instantaneous reclose aspect of the pilot reclose feature.

Instantaneous Trip K4 is an output for enabling tripping (not reclosing) of the breaker CB in response to an external instantaneous overcurrent condition, in a manner determined by five Instantaneous Trip Enable switches described later below. In FIG. 7 the trip coil TC of breaker CB is connected in series with a 52a (CB closed) contact, the Instantaneous Trip K4 contact, and an instantaneous overcurrent relay contact K50. In this way, instantaneous tripping of breaker CB occurs if CB is closed and there is an occurrence of an instantaneous overcurrent and contacts K4 are closed to permit a trip at a given point in the reclosing sequence. A contact K51 of a time overcurrent relay bypasses contacts K50 and K4 to trip the breaker if a time overcurrent condition arises while instantaneous tripping is blocked by open K4 contacts.

Another output contact K5, Block Load Tap Changer (BLTC), is used to inhibit operation of a load tap changer LTC of transformer 65 during the reclosing cycle until the reclosing relay 61 is reset or locked out. BLTC is used because transient currents produced by the reclosing operations could otherwise cause unintended operation by the load tap changer that would introduce even more transients.

Another three output contacts of the reclosing relay 61 are used to control alarms: Lockout alarm contacts K2, Reclose Fail alarm contacts K3 and Relay Fail alarm contacts K6. A Relay Fail alarm 136 is energized if there is a loss of power to the reclosing relay 61 or a microprocessor failure therein. A Relay Fail LED 137 in FIG. 8 is also turned on at such time. The Reclose Fail alarm 97 and the Lockout alarm 95 have been described hereinabove.

Reclosing relay 61 also includes the capability to collect data on the success of reclosing and to record each type or reclosing attempt in a nonvolatile Reclosing Event Memory (REM). Internal software counters are incremented during the reclosing sequence. When the reclosing relay 61 reaches the reset state, the accumulated date is transferred and stored in nonvolatile memory.

This data is readily available and is displayed on the front of the relay when an internally mounted TEST switch 141 is operated and Reset Time thumbwheels 105 are set to 00. The values stored in REM are not affected when the reclosing relay 61 is in the test mode, nor by the presence or absence of the MI jumper.

The accumulated data in REM is retained even through a power loss. If the relay loses power during a reclosing sequence, further data arising in that uncompleted sequence is not saved in present embodiment, because reset has not occurred. In other embodiments it is contemplated that data arising during an uncompleted sequence be saved.

Figure 9:
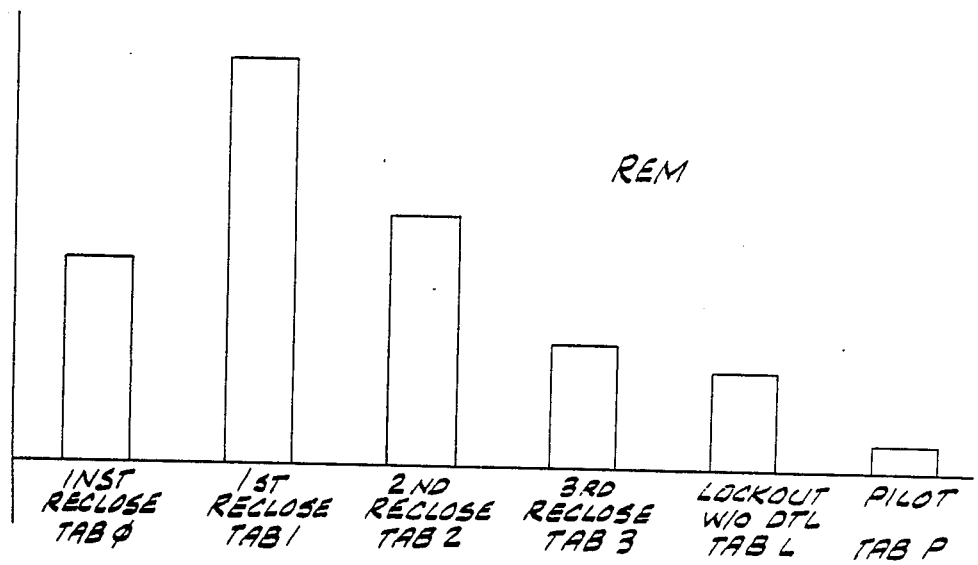
FIG. 9 is a histogram of running counts of data accumulated by inventive Reclose Event Memory (REM) apparatus and methods.

As illustrated by the histogram of FIG. 9, the Reclosing Event Memory accumulates numbers of Instantaneous Reclose attempts, 1st Time Delayed Reclose attempts, 2nd Time Delayed Reclose attempts, 3rd Time Delayed Reclose attempts and Pilot Reclose attempts that have occurred. Furthermore, a number of Lockouts without DTL is accumulated in order to provide a measure of the number of unsuccessful reclose sequences when reclosing was attempted.

In order to retrieve data from the REM, reclosing relay 61 is taken out of service and placed into the test mode by setting the TEST switch 141 of FIGS. 7 and 8 to the TEST position and RESET thumbwheels 105 of FIG. 8 are set to 00. Next, a thumbwheel switch 145 (which in normal mode is the least significant digit of thumbwheels 123) is used to select the type of date to be retrieved by adjusting the thumbwheel 145 to a numeral 0-5 as shown in the left column of Table I below.

TABLE I

| THUMB-WHEEL 145 | RECLOSE or DATA TYPE | STATUS INDICATOR | | |
|---|---|---|---|---|
| | | INST. | #1 | #2 |
| 0 | Instantaneous | 0 | 0 | 0 |
| 1 | 1st Time Delayed | 0 | 0 | 1 |
| 2 | 2nd Time Delayed | 0 | 1 | 0 |
| 3 | 3rd Time Delayed | 0 | 1 | 1 |
| 4 | Pilot | 1 | 0 | 0 |
| 5 | Lockouts w/o DTL | 1 | 0 | 1 |
| Any Other | None | 1 | 1 | 1 |

STATUS LED indicators 94 (INST.) 111 (#1) and 113 (#2) verify that the digit selected on thumbwheel 145 is being recognized by internal circuitry. A "1" in any STATUS indicator column of Table I indicates that a corresponding LED is turned on. Thumbwheels 109 are manually adjusted in TEST mode to display that REM count stored in memory which has been selected on thumbwheel 145. The procedure is as follows. Beginning with the most significant digit of thumbwheel 109, the operator selects a digit and observes indicators LED 115 (STATUS indicator #3) and LED 91 (RESET). LED 115 when on in TEST means "at most equal". LED 91 when on in TEST means "at least equal". These two indicators serve as a guide to indicate whether the entire 3 digit number shown on thumbwheel 109 is at most or at least equal to the data number selected for retrieval from REM. When both indicators 115 and 91 are illuminated, the number shown on the thumbwheels 109 equals the REM data number. It is noted that hardware is advantageously reused in the preferred embodiment because thumbwheels 109 are the RECLOSE TIME #1 thumbwheels in the normal mode and the LEDs 115 and 91 as well as thumbwheel 145 and thumbwheels 105 serve dual purposes too.

If it is desired to clear the data from REM before returning the relay to normal service operation, a RESET switch 151 is actuated in the TEST mode when Reset Time is set to "00". Otherwise, returning the TEST switch of FIG. 7 back to a "NORMAL" position retains the REM data that is stored in memory. The controls are returned to their normal service operation settings and the reclosing relay 61 is placed back in service for normal operation. In subsequent operation the reclosing relay 61 resumes accumulating the reclose attempt counts and unsuccessful reclose count beginning with the accumulated REM data that were read out in TEST mode. If the REM was cleared in TEST mode, the counts begin from zero.

Figure 10:
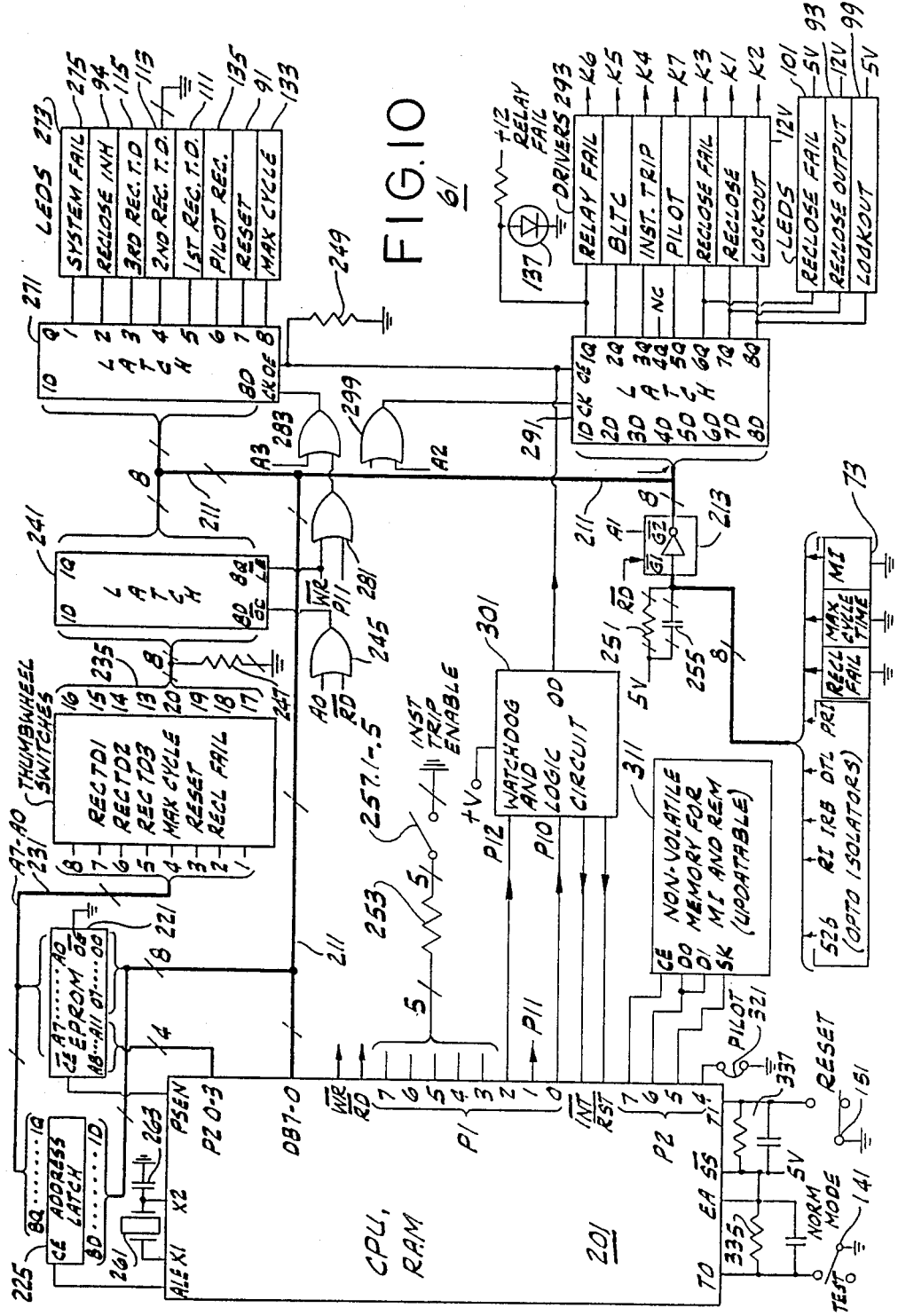
FIG. 10 is a partially block, partially schematic, diagram of an inventive microcomputer-based circuit for the inventive reclosing relay operating according to the inventive methods.

In FIG. 10 reclosing relay 61 has a 80C39 CMOS (complementary metal oxide semiconductor) microcomputer 201 that has an internal central processing unit (CPU) and random access memory (RAM). An 8 bit bus 211 connects microcomputer 201 to the output of an 8 bit inverting buffer 213 which is connected to the five optoisolators 73 for the 52b, RI, IRB, DTL and PRI inputs. The three jumper inputs for Reclose Fail, Max Cycle Time and Memory Initiate (MI) together with the optoisolators 73 supply 8 inputs to buffer 213.

Optoisolators 73 are interface circuits to provide current limitation, filtering, and optoisolation. The optoisolators 73 translate the state of external sensing and control contacts to logic levels. The logic levels are entered onto data bus 211 via buffer 213 for use by the microcomputer 201 which is programmed to recognize RI and PRI if either is present for a minimum time such as 6 milliseconds. For a reclosing sequence to begin, 52b must be present within 17.5 milliseconds of either RI of PRI. IRB, DTL and 52b are recognized within 6 milliseconds. The microcomputer 201 determines the course of action by selecting the proper reclosing sequence, and controls output contacts K1-K7 accordingly. The microcomputer 201 also performs all timing functions.

A main program and interrupt routine are stored in an EPROM (erasable programmable read only memory) 221. The 80C39 microcomputer 201 is one of a family of MCS-48 (TM) computers from Intel Corporation, Santa Clara, California. See *MCS-48 (TM) Family of Single Chip Microcomputers User's Manual,* 1980, Intel Corp., Chapter 1 and first 7 pages of Chapter 4. Microcomputer 201 addresses EPROM 221 at a set of address pins A0-A11 by supplying the lower 8 bits of the address from a set of pins DB 7-0 to an address latch 225 while enabling it from pin ALE (Address Latch Enable). The lower 8 bits of the address are then asserted to EPROM 221 by the Q outputs 8Q-1Q of latch 225 and the upper 4 bits of the address are asserted by microcomputer 201 from port P2 pins 0-3. A chip enable CE/ input of EPROM 221 is actuated by a signal from pin PSEN and an 8-bit output from pins 07-00 of EPROM 221 is fed back to pins DB 7-0 of microcomputer 221, thereby reading EPROM 221.

Front panel thumbwheel switches 81 allow the user to program the reclosing relay 61 for various time settings and limit reclosure attempts. Each thumbwheel selects an array of diodes leading to four output lines which when energized produce binary coded decimal (BCD) nibbles depending on thumbwheel setting which are read by the microcomputer 201. To energize the thumbwheel switches 81, microcomputer 201 latches a byte into address latch 225. The byte has 8 bits, one of which is a "1" and the rest are "0". Thumbwheel switches 81 have 8 input lines 231 and 8 output lines 235 to an 8 bit latch 241. A single one of the 8 input lines is energized to address two of the thumbwheels at a time. Two BCD nibbles (4 bits apiece) are respectively output from each of the two addressed thumbwheels, so that all 8 of the outputs lines 235 communicate BCD thumbwheel inputs to inputs 1D-8D of latch 241.

Microcomputer 201 collects the thumbwheel information by addressing input lines 1-8 of thumbwheel switches 81 with respective single high bits and latching the switch 81 output on lines 235 into latch 241 with a command WR/ to latch enable pin LE/. Outputs 1Q-8Q are tristate outputs that float electrically until a chip-enable OR-gate 245 supplies an output control signal to pin OC/ to output the latch contents onto data bus 211. OR-gate 245 responds to address bit A0 low and read output RD/ low. Microcomputer 201 is programmed in a conventional manner to segregate and interpret the thumbwheel information as two digit or three digit numbers as indicated in FIG. 8. Thumbwheels 103, 109, 121, and 123 are interpreted as having decimal tenths for the least significant digit. The numerals displayed on thumbwheels 105 are interpreted as representing a number that is ten times larger, see the legend "x10" in FIG. 8.

In FIG. 10 all pins from PSEN down to P2-4 of microcomputer 201 drawn on the right vertical side of the block therefor are provided with pullup resistors of +5 volts. These resistors are omitted from the drawings for clarity. Bus notation is employed for further clarity, wherein a slash through a line indicates multiple electrical conductors equal in number to a number indicated nearby. Slashes on either side of a resistor (such as resistors 247, 251, 253), capacitor 255, switches 257.1-.5 and buffers in buffer chip 213 indicate that the respective component is replicated for each conductor in a bus. Conductors WR/, RD/, P11, A0, A2 and A3 are broken in the drawing for clarity, although complete connections are represented thereby. Chip pins that are unused, held inactive or represent power leads $V_{CC}$ and $V_{SS}$ are omitted for clarity, in accordance with conventional drawing practice in the art. Microcomputer 201 has a 6 MHz. clock crystal 261 connected between input pins X1 and X2 and a capacitor 263 connected from pin X2 to common.

Microcomputer 201 provides signals on bus 211 to an 8-bit latch 271 which actuates a set of LEDs 273 including a memory alarm LED 275 and LEDs 94, 115, 113, 111, 135, 91 and 133. Latch 271 is clocked by chip enable OR-gates 281 and 283 when Write WR/ and output P11 and address bit A3 simultaneously are low. Microcomputer 201 also provides signals on bus 211 to an 8-bit latch 29 which actuates seven relay drivers 293 for output contacts K1-K7. Also, LEDs 101, 93 and 99 are respectively actuated from the latch 291 outputs 6Q-8Q respectively. Latch 291 is clocked by chip enable OR-gates 281 and 299 when Write WR/ and output P11 and address bit A2 simultaneously are low.

Operation of the microcomputer 201 is continuously monitored by a program circuit labelled Wafchdog and Logic Circuit 301 which in response to outputs P12 and P10 provides a latched automatic computer reset RST/ in event of malfunction (distinguished from Reset in reclosing parlance). Circuit 301 also includes a circuit for generating an interrupt signal INT/ when a loss of power to reclosing relay 61 is anticipated. Loss of power is determined to be imminent when a DC power supply output +V falls below a predetermined level.

Any appropriate power supply is used, of which four alternative examples from Basler Electric Co. are:

| Type | Nom. Input Voltage | Input Voltage Range |
|------|--------------------|--------------------|
| K    | 48 Vdc             | 24–60 Vdc          |
| J    | 125 Vdc            | 62–150 Vdc         |
|      | 120 Vac            | 90–132 Vac         |
| L    | 24 Vdc             | 12–32 Vdc          |
| Z    | 250 Vdc            | 140–280 Vdc        |
|      | 230 Vac            | 190–270 Vac        |

The power supply (not shown) is any conventional supply and preferably is a low burden, flyback switching design which provides a nominal ±12 Vdc for the reclosing relay circuitry. The nominal +12 Vdc output is also regulated to +5 Vdc for use by the microcomputer and associated circuitry.

In normal operation the microcomputer 201 randomly outputs pulses at intervals that have a reasonably predictable arithmetic mean. If these pulses are disrupted, the program monitor circuit 301 discontinues microcomputer operation, illuminates Relay Fail LED 137 through a first output of latch 271 and otherwise extinguishes the panel LEDs by forcing the rest of the latches 271 and 291 to high impedance by a high through an Output Disable line OD. (A resistor 249 otherwise holds line OD low). (A resistor 249 otherwise holds line OD low.) This causes all output contacts K1–K7, including the normally closed contacts K5 and K6, to assume their normal states. If the Output Disable is the result of something other than hardware failure, it is suitably remedied by manually interrupting operating power and turning it back on.

Five panel toggle switches 257.1–.5 for Instantaneous Trip Enable are respectively connected in series with five resistors 253 to corresponding pins P13–P17 of microcomputer 201. These Instantaneous Trip Enable switches 257.1–.5 select respective portions S1–S5 of the operational sequence of FIG. 2A during which the Instantaneous Trip relay contacts K4 are allowed to close.

The first switch 257.1 permits tripping when the reclosing relay 62 is in the reset state portion S1 and until the first breaker trip. The second switch 257.2 permits tripping in portion S2 after an instantaneous (first) shot has reclosed the breaker CB and before the next trip. The third switch 257.3 permits tripping only in portion S3 after the first delayed reclose attempt (second shot) and until the next trip. The fourth switch 257.4 permits tripping only in portion S4 after the second delayed reclose attempt (third shot) and until the next trip. The fifth switch 257.5 permits tripping only in portion S5 after the third delayed reclose attempt (fourth shot) and until the next trip to lockout. If all five switches 257.1–.5 are on, tripping is enabled by the instantaneous trip output contacts K4 at any time the circuit breaker CB is closed. By selecting any desired combination of the switches 257.1–.5, instantaneous tripping is enabled or disabled for any single time portion or selected combination of portions S1–S5. If all five switches 257.1–.5 are off, instantaneous tripping is disabled by the instantaneous trip output contact K4.

Compared to electromechanical reclosing relays the electronic approach used in this reclosing relay provides considerable flexibility in selecting the various time periods and options. Also, the preferred embodiment provides the Memory Initiate (or memory save) feature to store reclosing relay 61 operational status information and accumulated REM data in an electrically erasable, alterable or updatable nonvolatile memory 311 such as an E$^2$PROM or EAROM if power to the reclosing relay 61 is removed or lost. A suitable chip for memory 311 is a 16×16 bit serial nonvolatile static NMOS RAM, such as a type X2443 or X2444 Novram ® commercially available from XICOR, Inc., Milpitas, California. Each bit of a static RAM therein is overlayed with a bit of nonvolatile electrical erasable PROM. Data is transferred back and forth between the two memories in the chip instructions from microcomputer 201. MI and REM data is retained in the nonvolatile memory part of memory 311 while independent data can be accessed and updated in the RAM part of that memory chip. The memory 311 has pins CE for chip enable, SK for serial clock, DI for serial data input, and DO for serial data output.

In FIG. 10, microcomputer pin P27 is connected to memory 311 pin CE, pin P26 is connected to both pins DI and DO and pin P24 is connected to memory pin SK.

The connection or disconnection of a printed circuit board mounted, field-selectable link or jumper (MI) determines whether the MI function is enabled or disabled. When MI is enabled and power is removed, the identity of the current operation in the reclosing sequence is automatically stored in the memory 311. When power is restored, operations continue from the identified operation in the reclosing sequence where power was lost as discussed in connection with FIGS. 1, 2A–2D, 3A, 3B, 4A, 4B, 5A and 5B. With MI disabled, the reclosing relay undergoes a normal power-up routine and is reset or locks out when power is restored.

A pilot option jumper 321 connects microcomputer pin P24 to ground. When this jumper 321 is present, and PRI is activated, microcomputer 201 provides a separate instantaneous pilot reclose output to relay K7 upon a breaker trip.

Two testable inputs T0 and T1 of microcomputer 201 are respectively connected to single-pole double throw switches 141 and 151 for the TEST mode and RESET switch functions respectively. The rotors of these two switches 141 and 151 are both connected to common. Pull-up resistor-capacitor circuits 335 and 337 respectively hold testable inputs T0 and T1 high unless switches 141 and 151 are placed in NORMAL and RESET. Microcomputer pins EA and SS/ (Single-step) are connected high.

As is evident from the discussion hereinabove, microcomputer 201 constitutes electronic means connected to said first signal producing means (e.g. optoisolators 73) and said second signal generating means (e.g. circuit 301) for supplying a reclose command for the breaker when the breaker is open by executing one or more operations in a predetermined reclosing sequence, for storing information in response to the second signal identifying which operation in the reclosing sequence is currently being executed, and for using the stored information to continue from the identified operation in the reclosing sequence upon restoration of power. Microcomputer 201 is also responsive to the first signal producing means when the power is restored for continuing from the identified operation in the reclosing sequence by resuming with the same operation during which the second signal occurred if the breaker has not changed state since the occurrence of the second signal. Moreover, microcomputer 201 is also responsive to said first signal producing means when the power is restored for continuing from the identified operation in the reclosing sequences by immediately proceeding to a next subsequent operation of the reclosing sequence if the breaker has changed state since the occurrence of the second signal.

Microprocessor 201 has 128 bytes of internal RAM. The map of FIG. 11 shows bits in 8 important bytes of the internal RAM. The 8 bytes are the attempt byte ATTCNT, input byte INPCON, output byte OUTCON, Instantaneous Trip Enable Output (ITEO) byte OPTION, a loop state byte LPSTAT, Output LED byte OUTLED, a byte TIMEN identifying enabled timers that are currently timing, and a byte TIMOUT identifying timers that have timed out.

Remarks on the various bytes of FIG. 11 are set forth in Table II below in the order in which they are stored in the nonvolatile memory of FIG. 12. The bits in each byte are numbered from 7 (leftmost in FIG. 11) to 0 (rightmost).

TABLE II

| LPSTAT bits (only one of bits 1-5 is "1" at any one time) | |
|---|---|
| PWR INT | one if power has been interrupted; stored in NOVRAM when power goes down. |
| Bit 6 | Unused. |
| REC EN | one when a valid reclosing sequence has been initiated and stays 1 until the sequence is terminated. REC EN is not a 1 in reset or pilot enable or lockout or power up. |
| RST | one in the Reset state and zero in initial power up phase, or reclosing sequence or lockout. |
| LO | one in lockout. |
| PWR UP | one in initial power up sequence. |
| PI EN | one when a valid pilot sequence is initiated and the reclosing relay comes off reset. |
| ATTCNT (Attempt counter) | |
| Bit 7 | TDC Carry set to one if "000" on Max Cycle Time thumbwheels. Total Duty Cycle is 1000 seconds. |
| Bit 6 | Reset Carry set to one if "00" on Reset Time thumbwheels. Reset Time is 1000 seconds. |
| Bit 0 | Reset state. |
| Bit 1 | Instantaneous trip set to 1 on inst. trip. A "1" is shifted left from bit 0. |
| Bits 2,3,4 | Have a "1" shifted through them if and when the relay reaches their respective 1TD, 2TD, and 3TD reclose time delays. If relay is to lock out upon reaching 2TD, for example, then 2TD thumbwheels are set to "000" and the 2TD bit is preset to a 1, and then when 2TD is reached, the microcomputer sees that 2TD is already 1. |
| Bit 5 | When "1" is shifted into bit 5, recloses are exhausted, and relay goes to lockout. |
| TIMEN | Control Byte Identifying Enabled Timers |
| 3TD, 2TD, 1TD | one for Third, Second or First Time Delayed Reclose Timer enabled |
| RF | one if Reclose Fail Timer is enabled. If any of 3TD-1TD are enabled then RF is a 0. |
| RST | One if Reset Timer is enabled. Only one of the groups (A) RST, (B) RF, and (C) 1TD 2TD, 3TD is a 1 at any given time. |
| TDC | One if Total Duty Cycle Timer (Max Cycle Timer) is enabled. |
| TIMOUT | Control Byte Identifying Timed Out |

TABLE II-continued

| | Timers. Timer identified same as in TIMEN. If a timer is timed out there is a 1 in the corresponding bit position, otherwise zero. |
|---|---|
| OUTLED | Control Byte of Panel LEDs one is set for each of 8 LEDs which are lighted, identified as on FIG. 11 map. |
| OUTCON | Control Byte of Output Contacts (Positive logic) In every case OUTCON 1 bit signifies an energized output relay whether is it is normally open or normally closed type. LTC is "1" if BLTC is enabled. |

As discussed above microcomputer 201 also constitutes means for producing and storing data representing the current state of the circuit breaker and whether operations are in a reclosing relay reset condition, in a reclosing sequence enabled condition, in a pilot relaying sequence or in a lockout condition, and when operations are in a reclosing sequence enabled condition also producing and storing data representing whether operations are in an instantaneous reclose attempt condition or a time delayed reclose attempt condition. The MI jumper input constitutes means for disabling the electronic means (e.g. microcomputer 201) from storing the information identifying which operation in the reclosing sequence is currently being executed. Microcomputer 201 supplies a lockout signal after a predetermined number of reclose commands have been supplied and the circuit breaker still reopens within a predetermined reset time interval after the last reclose command, stores lockout information in nonvolatile form when the lockout signal and the second signal are both present, and supplies the lockout signal upon restoration of power if the first signal indicates that the breaker is open.

The map of FIG. 12 for nonvolatile memory 311 shows 16 rows, and each rows holds 16 bits. Since each RAM byte has 8 bits, each row of memory 311 can hold as many as two RAM bytes. Not all of the memory 311 is needed, as illustrated in FIG. 12. Microcomputer 201 upon occurrence of a power loss with MI enabled and with the power loss occurring in a reclosing sequence, stores the RAM bytes ATTCNT, OUTCON, LPSTAT, OUTLED, TIMEN and TIMOUT shown in the bit map of FIG. 11. There is no need to store INPCON since it is derived from the hardware inputs of the reclosing relay 61, and these inputs are themselves checked when power is restored. Similarly the ITEO OPTION byte is derived from the switches 257.1-.5 the positions of which are not affected by a power loss.

Only one of time values RECTD (Reclose Time Delay) of RSTTIM (Reset time) is stored in NOVRAM in a given instance, according to which timer is enabled as indicated by TIMEN byte. The timer value is the time *remaining* until timeout, and only the two most significant BCD digits are stored as the 8 bits. Total Duty Cycle Time (Maximum Cycle Time) TDCTIM is a separate byte from RECTD/RESTTIM, and TDCTIM holds the timer value for the time *remaining* until timeout. A Reclose Fail Time RCFLTM remaining until timeout is also stored, in FIG. 12. If both digits are zero, then a time delay of zero is assumed, except for TDCTIM and RSTTIM where digits of "9" are assumed. Thus, microcomputer 201 has an operation in the reclosing sequence that comprises timing a predetermined time interval and is responsive to an occurrence of the second signal (e.g. INT/) for storing a value representing a time period remaining in the predetermined time interval when the interval is being timed and the second signal occurs. The predetermined time interval can be a reclose time delay, a reset time interval after reclosure, a maximum cycle time for the reclosing relay, or a reclose fail time, for instance.

The Reclose Event memory (REM) is that part of the NOVRAM in which accumulated data on reclosing relay operations is stored. The REM has 6 words of 2 bytes each (twelve bytes total) stored as binary values and are software converted to BCD for readout (as 3 digit BCD values). Four of the words are designated TAB0, TAB1, TAB2 and TAB3 for the running count of the number of respective times the reclosing relay 61 has executed an instantaneous reclose attempt and first, 2nd and 3rd reclose attempts.

A REM word TABP holds the running count of the number of times the relay has done an instantaneous pilot reclose attempt. Subsequent time delayed attempts in a pilot reclose sequence are cumulated with TAB2 and TAB3. (Pilot output K7 is only contact-closed on the instantaneous pilot shot. Operations revert to the reclose output contacts K1 for the time delayed attempts in a pilot reclose sequence.) Microcomputer 201 thus stores respective running counts to specify corresponding numbers of occurrences over time of the instantaneous reclosure and each time delayed reclosure, supplies a pilot reclose command separate from the first-named reclose command for the breaker and stores a running count in nonvolatile form specifying the number of occurrences of the pilot reclose command.

Another REM word TABL holds the running total of unsuccessful reclose attempts and does not include the number of times DTL has been initiated. TABL thus counts only the number of times that all of the reclose attempts have been exhausted and lockout has occurred and does not include the number of times that lockout has been commanded by the DTL input.

Microcomputer 201 thus stores in nonvolatile form a running count of the number of occurrences over time of a particular operation in the reclosing sequence, including a running count of the number of occurrences over time of lockout resulting from unsuccessful reclosures. In other words a running count is stored in nonvolatile form specifying the number of occurrences of the lockout signal excluding occurrences of the lockout signal responsive to the DTL signal.

Figure 13:
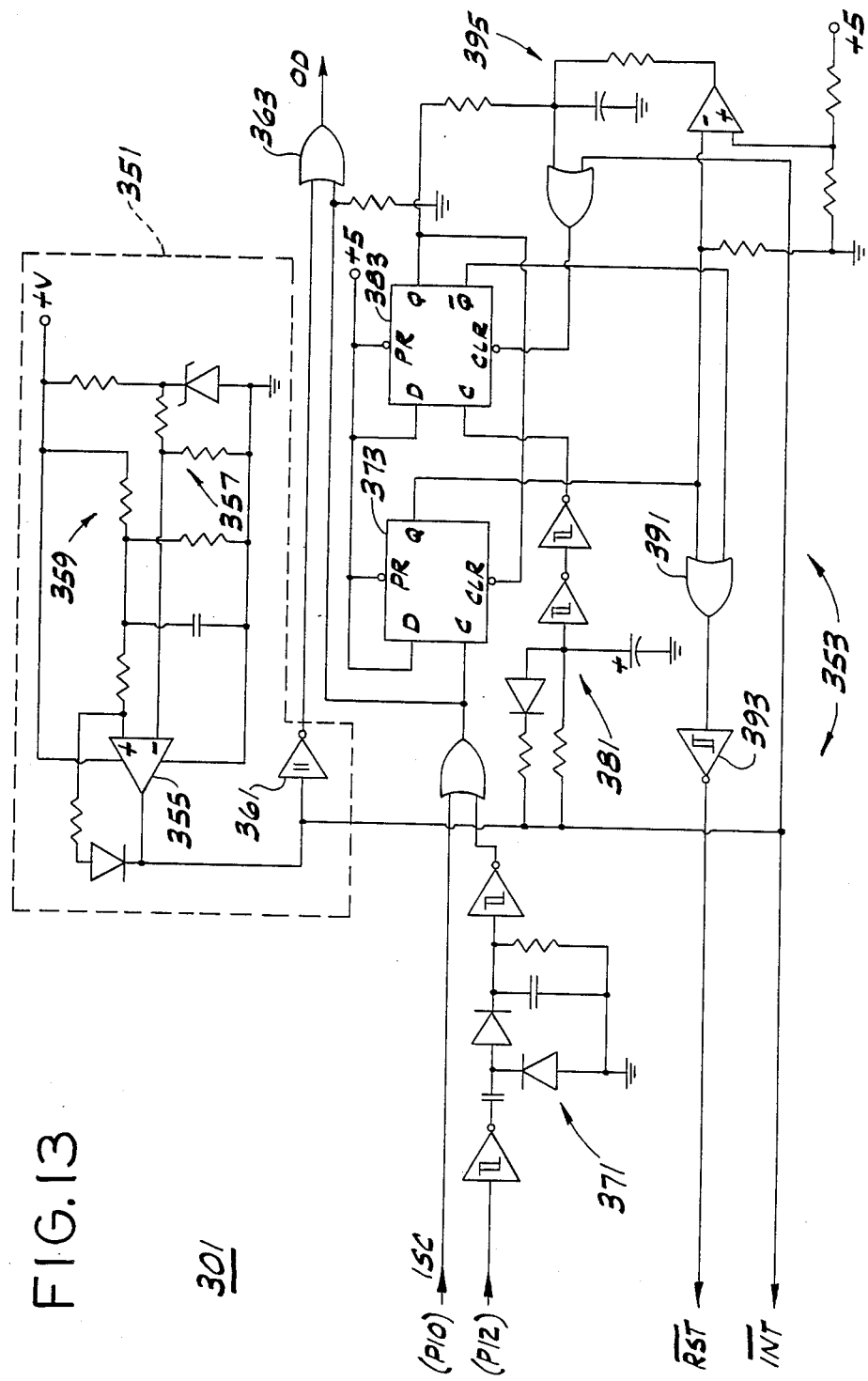
FIG. 13 is a schematic diagram of a circuit for anticipating a power loss and for detecting malfunction if it occurs in the microcomputer of FIG. 10.

In FIG. 13, circuit 301 of FIG. 10 includes a power loss detector circuit 351 and a watchdog circuit 353 for monitoring microcomputer 201.

Power loss detector circuit 351 has a comparator 355 that compares with a reference voltage a second voltage proportional to the actual voltage of a nominally +12 volt output of a power supply (not shown) for reclosing relay 61. The reference voltage is supplied to the inverting input of comparator 355 from a network 357 of resistors and a Zener diode connected between the power supply output +V and common. The voltage proportional to the actual power supply voltage is supplied to the noninverting (+) input of comparator 355 by a network of resistors 359. If the power supply voltage falls below the reference voltage, loss of power has commenced, is probable or is imminent, and the power loss detector circuit 351 sends an interrupt low signal INT/ to the microcomputer 201. Upon receipt of this signal, the microcomputer stores information in the nonvolatile memory 311 of FIG. 10. The signal INT/ is inverted by an inverter 361 to provide output disable signal OD through an OR-gate 363. Power loss detector circuit 351 thus constitutes means for generating a second signal when a loss of power to the reclosing relay is anticipated.

In FIG. 13 watchdog circuit 353 has a program monitor circuit including a pulse-sensing capacitor circuit 371 with an associated flip-flop 373. Watchdog circuit 353 also has a power-on reset circuit with a slow-charge-fast discharge capacitor circuit 381 and an associated flip-flop 383. Microcomputer 201 is initially held in hardware reset by the power-on reset circuit (flip-flop 383 output Q/ high) until power has been on for a predetermined length of time. Microcomputer 201 is also forced to reset by the program monitor circuit if the microcomputer ceases to produce pulses on line P12 as expected in normal operation (flip-flop 373 Q output clocked high by circuit 371). When microcomputer 201 supplies a high signal ISC (Interrupt Services Complete) on a separate line P10, flip-flop 373 output Q is clocked high regardless of the action of circuit 371 and forces a hardware reset RST/ through an OR-gate 391 and an inverter 393. Additional circuitry 395 clears the flip-flops 373 and 383 at an appropriate time.

Microcomputer 201 thus produces pulses indicative of proper functioning of itself. The program monitor circuit with its circuits 371 and 373 thus generates a third signal (e.g. RST/) upon a cessation of the pulses.

The flowcharts of FIGS. 14-21 further describe an example of operations and methods utilized in practicing the invention. Also, these flowcharts are provided to even more fully enable the worker in the art to program software for microcomputer 201 as represented by the flowcharts.

Figure 14:
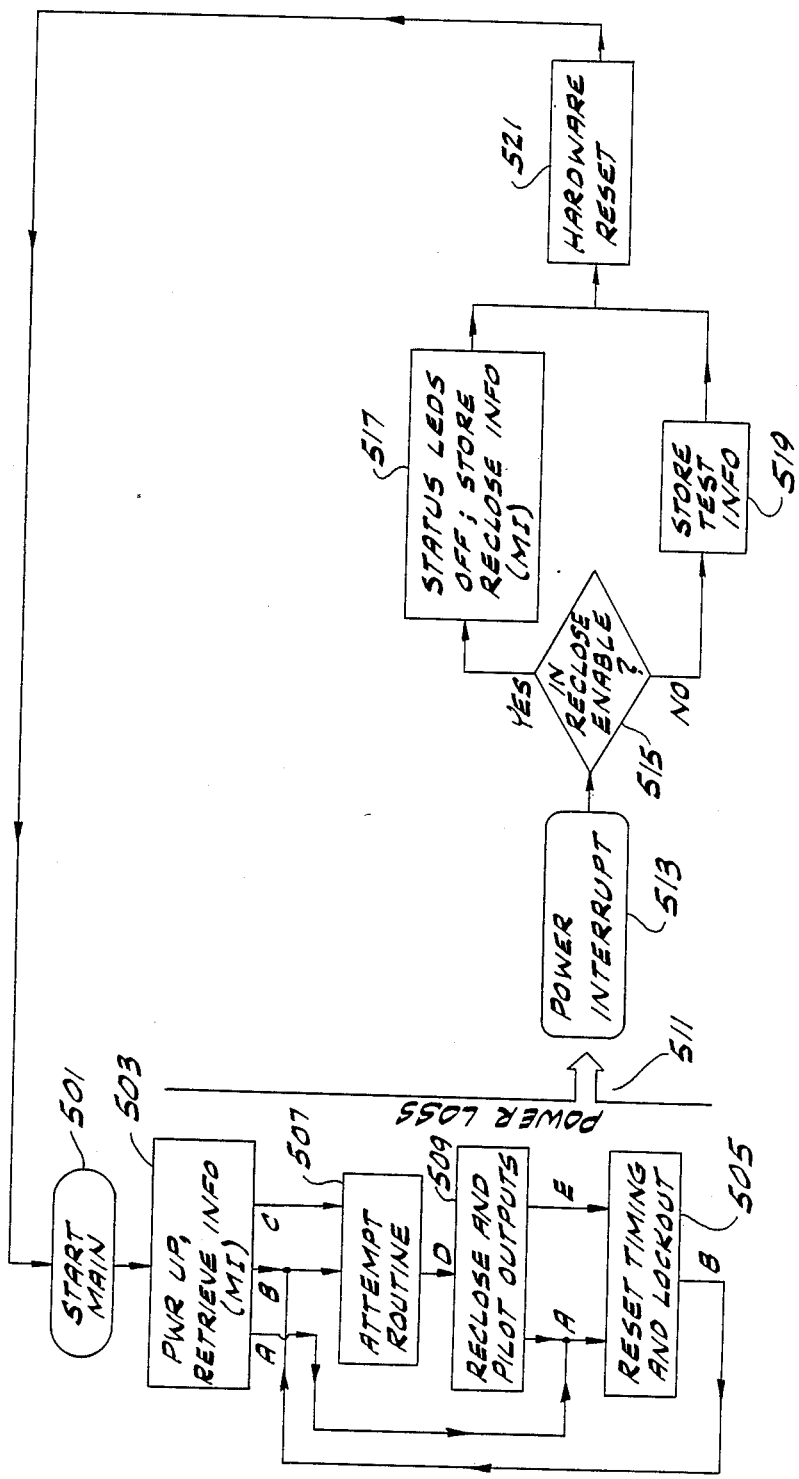
FIG. 14 is a summary flowchart of operations in a main routine and an interrupt routine for the microcomputer of FIG. 10 according to the inventive methods.
Figure 15:
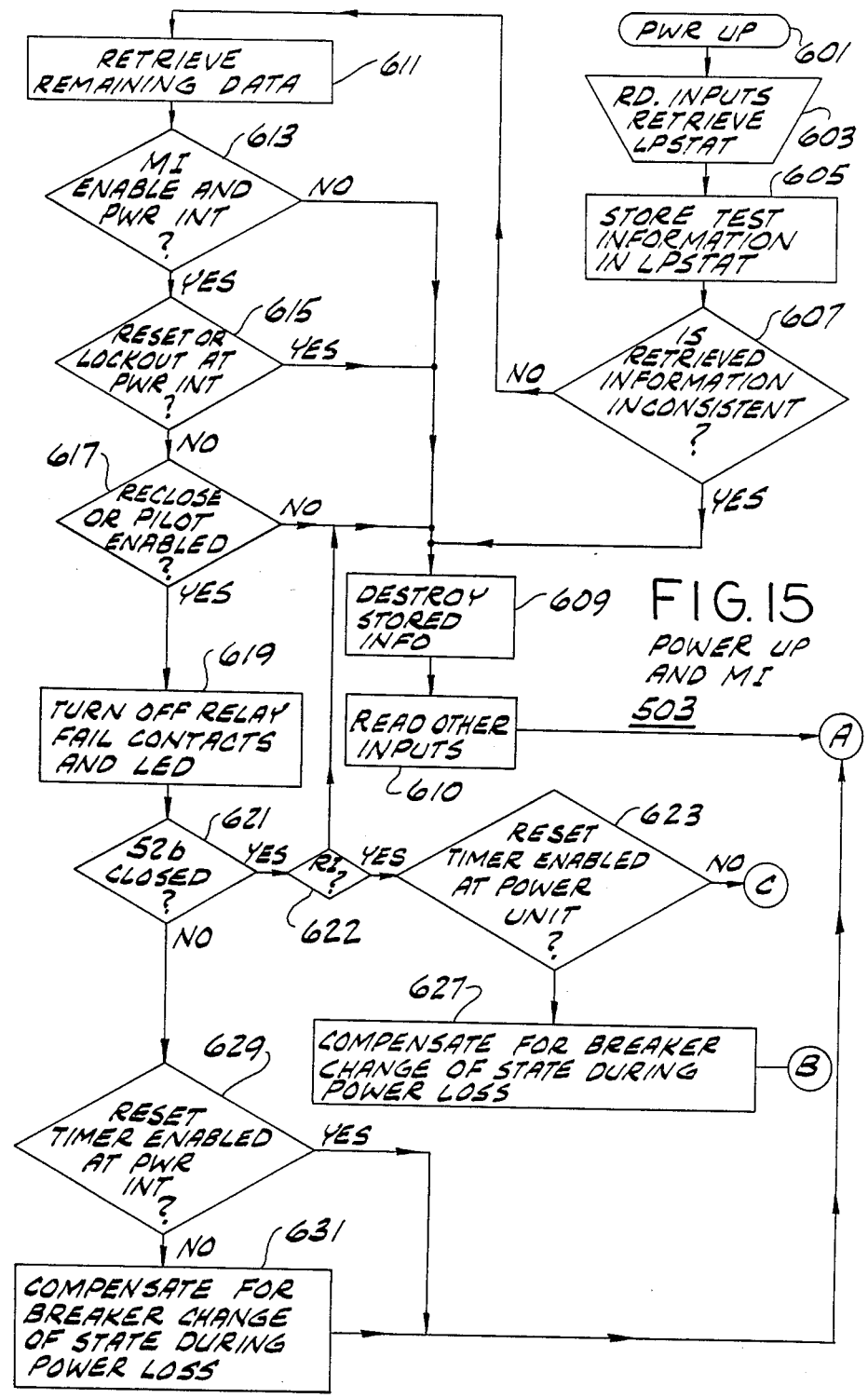
FIG. 15 is a flowchart of a Power Up and MI section of the main routine of FIG. 14.

In FIG. 14 operations in reclosing relay 61 commence at a START MAIN point 501 and proceed in microcomputer 201 to a block 503 involving Power Up operations and retrieval of information in the Memory Initiate (MI) function as described further in connection with FIG. 15. Operations in the present embodiment reach a point A, B, or C after block 503. When operations reach point A, calling for the reset timer to start, a Reset Timing and Lockout block 505 is next executed as described in FIG. 16. Operations that reach points B or C involve different open-breaker conditions and enter an Attempt Routine block 507 at different places. Operations in Reset Timing and Lock-out block 505 can reach point B also proceed to Attempt Routine block 507.

Figure 18:
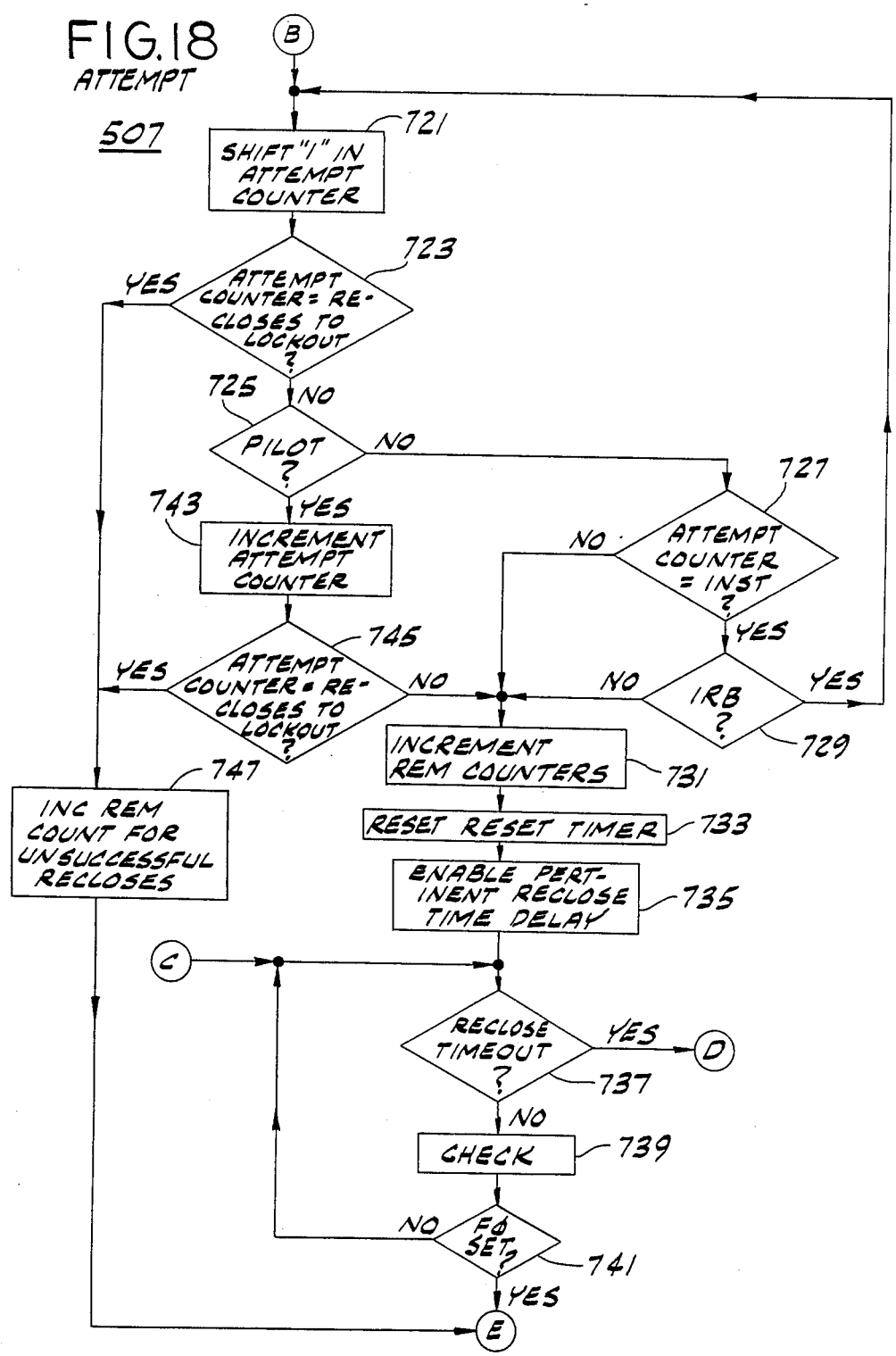
FIG. 18 is a flowchart of an Attempt section of the main routine of FIG. 14.

Attempt Routine block 507 includes preparing for a reclosing attempt and timing reclose time delays as described in FIG. 18. Attempt Routine block 507 is followed by a Reclose and Pilot Outputs block 509, described in FIG. 19, which actually issues the reclose commands and determines how long to maintain them. Depending on the result of the operations in block 509, Reset Timing and Lockout block 505 is either entered for reset purposes at point A or for lockout at point E.

A power loss can occur anywhere in the blocks 503-509, as indicated by a general arrow 511 in FIG. 14. When a loss of power to the reclosing relay 61 is anticipated, Watchdog and Logic Circuit 301 of FIG. 10 generates an interrupt signal INT/ to microcomputer 201 in a power interrupt step 513 of FIG. 14.

Microcomputer 201 thereupon jumps to a predetermined hardware location and begins executing a power loss interrupt routine. A test is made in a step 515 to determine whether the reclosing relay 61 is in a reclosing enabled condition as indicated by a "one" in the Reclose Enable bit REC EN of the loop state LPSTAT byte of FIG. 11. This condition typically signifies that reclosing relay 61 has left Reset and is going through a reclosing sequence. If so, operations proceed to a step 571 to turn off the Status LEDs 94, 111, 113, 115 and 135. Also, in step 517, the bytes LPSTAT, ATTCNT, TIMEN, TIMOUT, OUTLED and OUTCON of FIG. 11 are stored in nonvolatile memory 311 of FIGS. 10 and 12. In addition, the time remaining in pertinent timer registers is stored in memory 311. These include Reclose Time Delay RECTD, Reclose Fail Time RCFLTM and Reset Time RSTTIM, depending on which timer is appropriate. Also, Total Duty Cycle Time (TDCTIM) is stored in memory 311, which time is the time remaining in the maximum cycle time permitted to the relay.

If reclosing relay 61 is not in a reclosing enabled condition, then a branch is made from step 515 to a step 519 to store a 7A byte in LPSTAT in memory 311 to tell the microcomputer that there is no particular operation in a reclosing sequence to remember when power is restored. Operations respectively proceed from either of steps 517 and 519 to a step 521 to reset the hardware by issuing a Interrupt Services Complete signal from pin P10 of microcomputer 201 to Watchdog and Logic circuit 301 of FIG. 10. In this way, microcomputer 201 is kept in a hardware reset state as the power goes down to prevent further operations until power is restored, whence operations loop back to Start Main point 501.

In FIG. 15 operations commence with Power Up step 601 and proceed to a step 603 to retrieve the loop state byte LPSTAT and attempt byte ATTCNT of FIG. 12 from nonvolatile memory 311. Also in step 603 the inputs for INPCON are read from buffer 213 of FIG. 10.

Next in a step 605 a test byte consisting of 7A hexadecimal is stored in place of LPSTAT in memory 311. The test byte (01111010) is different from any value that LPSTAT would ever properly have in normal operation.

Operations proceed to a decision step 607 where LPSTAT as retrieved is tested to determine if more than one of the bits Reclose Enable (REC EN), Reset (RST) or lockout (LO) are ones. Such circumstance is a logical inconsistency for a reclosing relay since these three events are mutually exclusive. If the circumstance is detected, the Memory Initiate (MI) is aborted, and microcomputer 201 branches to a step 609 where the information in memory 311 is overwritten to destroy the contents and then a step 610 reads all inputs from the thumbwheel switches 81 and instantaneous trip switches 257.1-.5. In step 610 if there is a nonzero value for any timer in the TIMEN byte than such timer value will not be overwritten by thumbwheel switch input read at this time.

If in step 607 no inconsistency is detected, operations proceed to a step 611 where all of the remaining data including both operational information and accumulated REM data in rows 2 through F of memory 311 is retrieved. Then in a decision step 613 a test is made to determine whether both MI is enabled (MI EN=1 in INPCON) and there has been a restoration of power after a power interrupt (PWRINT=1 in LPSTAT). If not, operations branch to step 609 to destroy the bytes in memory 311. If so, operations proceed to a step 615 where a test is made to determine whether reclosing relay 61 was in reset or lockout at power interrupt (RST or LO=1 in LPSTAT).

Microcomputer 201 is thus also responsive to an occurrence of the second signal (e.g. INT/) for storing a datum (e.g. PWR INT) representing occurrence of a power interruption, and upon restoration of power for utilizing the stored information identifying which operation in the reclosing sequence was currently being executed to continue in the reclosing sequence only if the stored datum is also present. Microcomputer 201 also detects an inconsistency in the stored information and prevents the use of the stored information if the inconsistency is detected.

If reset or lockout in step 615 then a branch is made to step 609 to destroy the stored bytes. If there was neither reset nor lockout in step 615, then operations proceed to a step 617 where a test is made to determine whether the reclosing relay was either in a normal reclose sequence or a pilot reclose sequence (REC EN or PI EN=1 in LPSTAT). If the relay was not in either sequence, then operations branch to step 609 to destroy the bytes in memory 311. If the relay was in either sequence, then operations proceed to a step 619 where microcomputer 201 energizes relay K6 so that normally closed contacts thereof become open and the associated LED 137 extinguishes to remove any Relay Fail indication.

Next, microcomputer 201 tests the breaker state in a step 621, and if the 52b contact is closed (CB open) then a branch is made to a step 622 to test for a Reclose Initiate input signal. If there is no RI signal, operations branch to step 609 to destroy stored information and proceed in a non-MI mode which will result in lockout as shown in FIGS. 3B and 4B. If there is an RI signal in step 622 then operations proceed to a step 623 where a test is made to determine whether the reset timer was enabled at power interrupt (TIMEN bit RST=1). If so, the breaker must have opened during the time of power loss as depicted in FIG. 4B and operations proceed to a step 627 to compensate for the breaker change of state during power loss. In step 627 the reset timer is disabled and based on the state of the attempt byte ATTCNT a timer is enabled for the pertinent reclose time delay which is identified by a single "one" in one of the bit positions INST, 1TD, 2TD or 3TD of ATTCNT. Operations proceed to point B in Attempt FIG. 18 which is described later hereinbelow.

If in step 623, the reset timer was not enabled at power interrupt (RST=0 in TIMEN) then conditions are as depicted in FIG. 3B and operations proceed to a point C in FIG. 18.

If in step 621, the breaker CB is closed (52b contacts not closed) the operations proceed to a step 629 where the same test as in step 623 is performed. If reset timer enabled with breaker closed, then conditions are as depicted in FIG. 2D and operations proceed to a point A of FIG. 16 for reset timing. If in step 629 the reset timer was not enabled, then the breaker CB must have become closed during the period of power loss as illustrated in FIG. 5B. Operations then proceed to a step 631 to compensate for the breaker change of state during power loss. This is accomplished by disabling the reclose time delay timer that must have been enabled (by zeroing the bit positions 1TD, 2TD and 3TD in byte TIMEN) and enabling the reset timer by setting RST bit in TIMEN to "one". Also in step 631 the reset timer is initialized from the reset thumbwheels 105 of FIG. 8.

Figure 16:
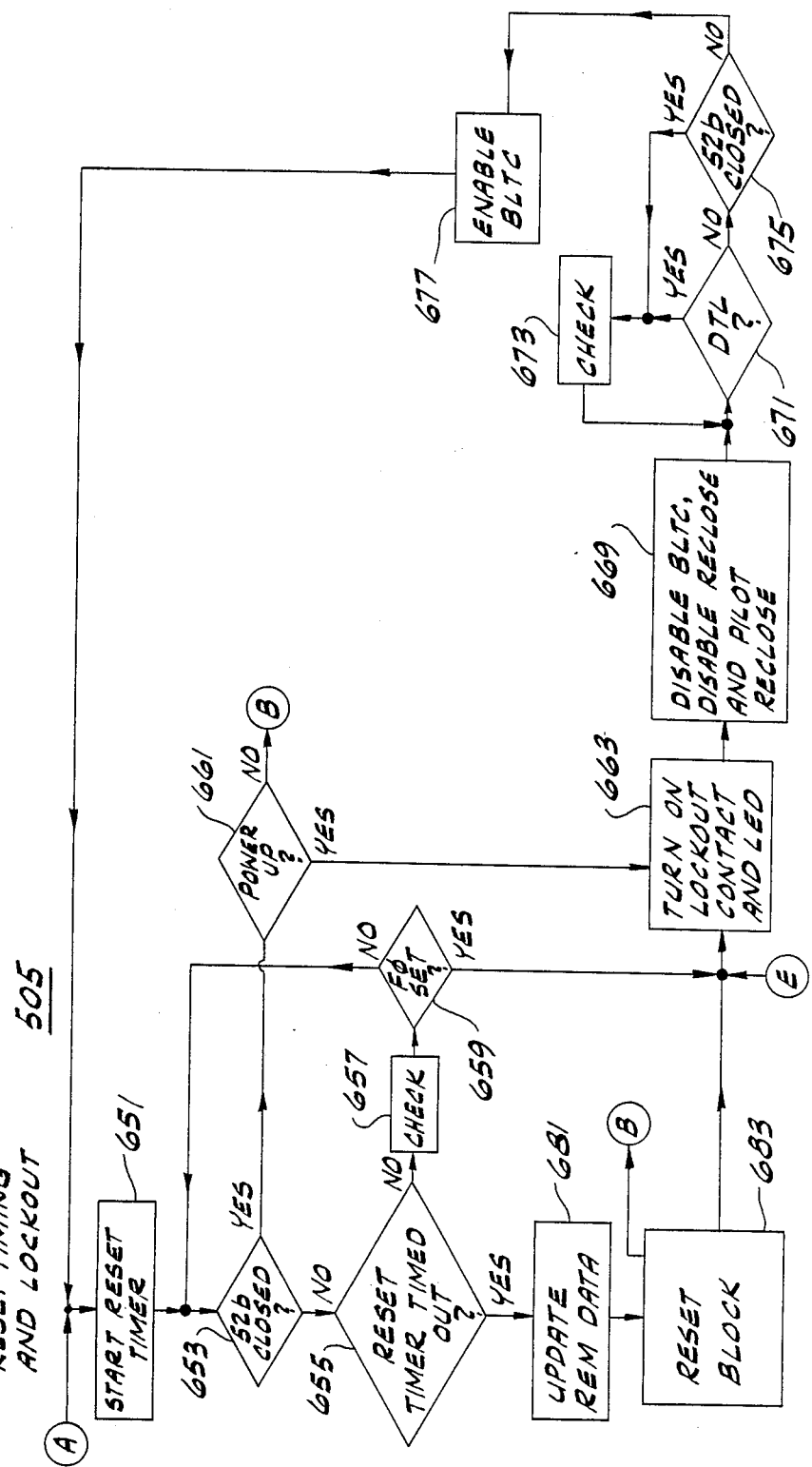
FIG. 16 is a flowchart of a Reset Timing and Lockout section of the main routine of FIG. 14.

Operations proceed to point A of FIG. 16 for reset timing.

Microcomputer 201 thus constitutes means generally operable after the restoration of power for compensating in the reclosing operations for a change in state of the circuit breaker that occurs after the loss of power and before the restoration of power.

In FIG. 16 operations at point A proceed to a step 651 where the reset timer is initiated by setting a "one" to the TIMEN register bit named RST (Reset) in FIG. 11. Next a test is made in a step 653 for 52b. If 52b is open (CB closed) operations proceed to a step 655 to determine whether the reset timer has reached zero (timed out). If not timed out, then a step 657 checks operations for max cycle time out, test mode, pulse to watchdog 301, and update front panel LEDs and instantaneous trip output contacts as discussed in further detail in FIGS. 20 and 21. Check step 657 is a subroutine which is accessed in other sections of the flowchart as well. After check step 657 a test is made in a step 659 for a lockout flag F0. If F0 is not set then operations loop back to step 653 until the reset timer is timed out in step 655 or until the breaker CB is tripped again and 52b is closed in step 653. If a trip occurs a branch is made from step 653 to a step 661. In step 661 if there is no power up bit set in LPSTAT, indicative of normal power up sequence without MI recovery, then operations proceed on to point B in Attempt FIG. 18 to start the next reclose attempt. In step 661 if there is a power up condition in that the power up bit PWR UP in LPSTAT is set but PWR IN is zero then operations proceed to a lockout step 663. In step 663 microcomputer 201 closes the lockout contact K2, turns on lockout LED 99 an disables all timers by clearing byte TIMEN and TIMOUT. Lockout step 663 is also reached from step 659 if lockout flag F0 is set in the check routine of FIG. 20 due to a DTL or Max Cycle Time expired.

Operations proceed from lockout step 663 to a step 669 to disable the BLTC contacts by deenergizing normally closed relay K5 to close the contacts for the load tap changer on transformer 65 of FIG. 7. Also, in step 669 the bits REC EN and PI EN are cleared to disable the reclosing and pilot reclosing functions of reclosing relay 61.

Next, a DTL test is made in a step 671. If there is DTL, operations loop back to step 671 through the check subroutine in a step 673. If there is no DTL, then 52b is tested in a step 675 and if the breaker is open operations still loop back to step 671 through the check subroutine step 673. If the breaker CB is closed in step 675 as by a manual reclosure or by other means, then operations go on to a step 677 to energize relay K5 to open its contacts and block the load tap changer of transformer 65. The reason for this is that the reclosing relay is out of the lockout routine but not out of the lockout state and also not in the Reset state yet. An upcoming breaker trip is not unlikely even though the breaker is closed, and the load tap changer should be blocked at this time. After step 677 operations loop back to step 651 where the reset timer is restarted with the setting called for on thumbwheels 105.

If the breaker remains closed for the full reset time operations proceed from step 655 to a step 681 to update the REM data from the microcomputer 201 RAM to the nonvolatile memory 311. Then operations for the reset state are executed in a reset block 683 which is further described in FIG. 17 next.

Operations in reset block 683 commence with Begin Reset State point 691 and go to a step 693 to light the RESET LED 91, disable BLTC to permit load tap changer operation by deenergizing relay K5, clear LPSTAT and ATTCNT and set the reset bit RST therein and in ATTCNT, turn off lockout relay K2 and lockout LED 99, turn off Max Cycle LED 133, energize the normally closed Relay Fail relay to open its contacts K6, and turn off Relay Fail LED 137.

Now the breaker state is tested in a step 695. If 52b is open (CB closed) then operations loop through check subroutine in a step 697 and test the lockout flag F0 (for DTL) in a step 699. If lockout F0 is not set, then operations loop back to step 695 as long as the reclosing relay 61 is in reset with CB closed and no DTL. If DTL occurs and F0 is set in step 699 operations branch to point E in FIG. 16 and reach lockout step 663.

Figure 17:
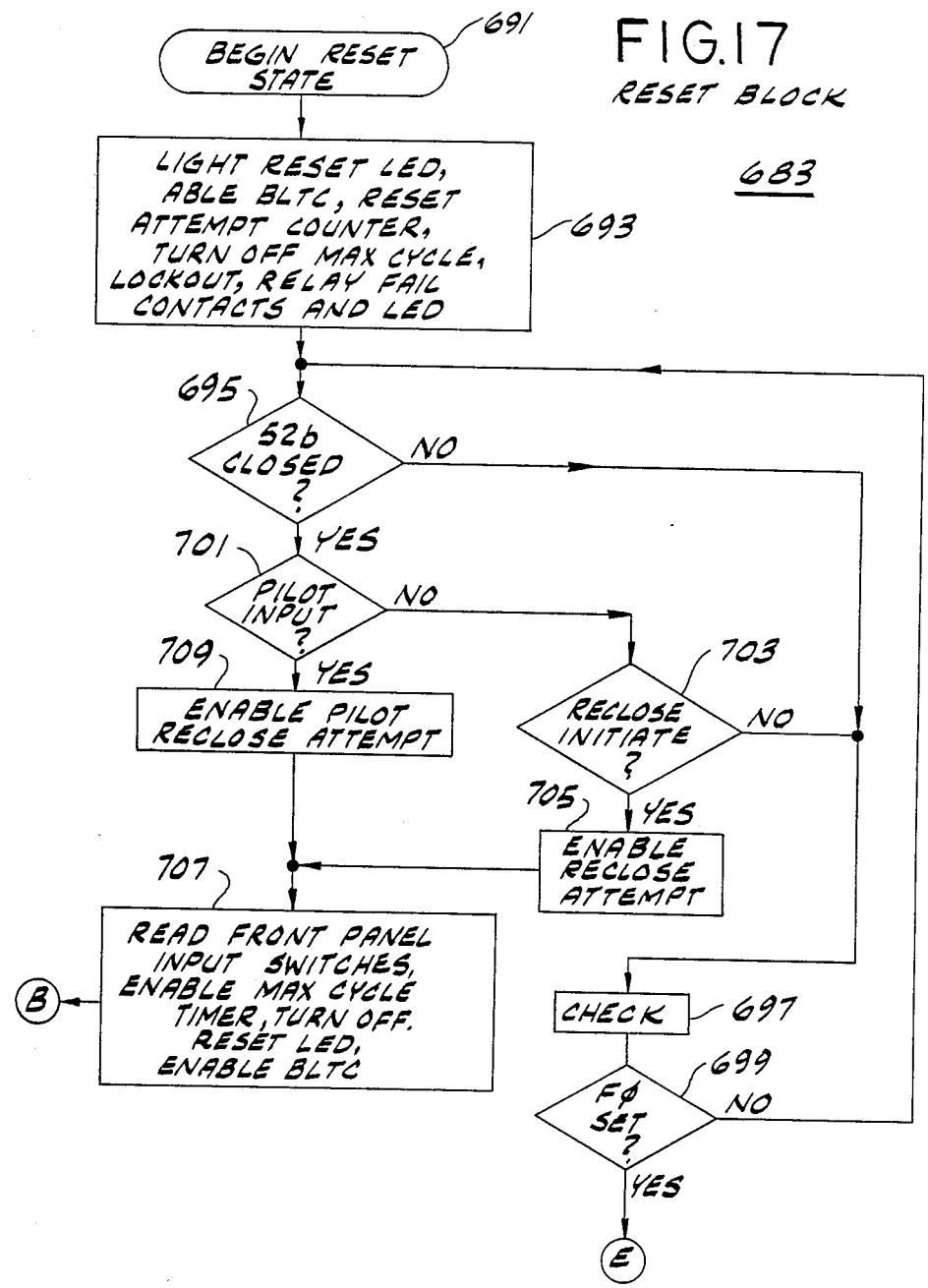
FIG. 17 is a flowchart of a Reset Block section in the flowchart of FIG. 16.

In FIG. 17 if the breaker opens (52b closed) in step 695 then operations branch to a decision step 701. If there is no pilot reclose input (PRI=0 in INPCON) in step 701 then operations loop to step 703. If there is no reclose initiate (RI=0 in INPCON) in step 703 then the loop continues with check 697 and F0 test 699 and back to step 695. However, if there is reclose initiate RI=1 in step 703 then a branch is made to a step 705 to prepare for exit from the reset state by enabling a reclose attempt by setting REC EN to "one" in LPSTAT and clearing reset bit RST in LPSTAT. Then in a step 707 microcomputer 201 reads the front panel thumbwheels 81 and instantaneous trip switches 257.1–.5, enables the max cycle timer (set TDC bit in TIMEN to 1), turns off the RESET LED 91, and enables BLTC (LTC=1 in OUTCON) to block the load tap changer. If in step 701 a pilot input is sensed (PRI=1 in INPCON) then operations branch to a step 709 where pilot reclose is enabled (PI EN=1 in LPSTAT) and reset bit RST therein is cleared whereupon step 707 is performed. After step 707 operations proceed to point B of the Attempt routine in FIG. 18.

In FIG. 18 operations at point B go on to a step 721 to shift the "1" in the RST bit of ATTCNT left as indicated by an arrow 722 in FIG. 11. Then in a step 723 of FIG. 18 the attempt byte, which acts as a counter, is tested to determine if this new attempt is an ATTCNT bit 5 and thus calls for lockout. If not, then operations proceed to a step 725 to check for pilot enable (PI EN=1 in LPSTAT). If no pilot enable, then a step 727 tests whether the attempt counter is in the instantaneous position (INST=1 in ATTCNT). If so, the instantaneous reclose bypass IRB input (in INPCON) is tested, and if there is IRB, operations loop back to step 721 to shift the attempt counter to the 1TD bit. If there is no IRB in step 729, then a step 731 increments the REM counter for the pertinent attempt as indicated by the bit which is one in the last 5 bits of ATTCNT. Next a step 733 resets the Reset Timer to the initial value from which it should count down, by rereading the thumbwheels 105 of FIG. 8. Then a step 735 enables the pertinent reclose time delay by setting the corresponding bit in TIMEN to "one". (If a first pilot shot, the first reclose time delay value is disregarded and the shot is made instantaneous.) Next, a loop is entered to monitor for timeout of the just-enabled reclose time delay, beginning with a step 737 to test for timeout. If this is an instantaneous reclose, timeout is immediate. Unless there is timeout, operations loop through check subroutine in a step 739 and a test for lockout flag F0 in a step 741 and back to step 737 until timeout. If there is a Max Cycle time out in Check or if DTL, then operations branch from step 741 to point E of FIG. 16 and lockout step 663 therein. In FIG. 18 if reclose timeout occurs, operations exit step 737 to point D in Reclose and Pilot Outputs FIG. 19.

Thus microcomputer 201 supplies the reclose command for the breaker when the breaker is open by executing an instantaneous reclose attempt and at least one time delayed reclose attempt and the reclosing relay further has means (e.g. optoisolator for IRB input) for selectively causing the microcomputer 201 to bypass the instantaneous reclose attempt.

If in FIG. 18 step 727 the attempts have gone beyond the instantaneous shot, a branch is made to step 731. Also, if in step 725 there is a pilot enable (PI EN=1), which would be immediately sensed after the first entry into Attempt from the Reset Block, then a branch is made to a step 743 to increment (shift) the attempt counter ATTCNT. In this way the first pilot shot has a "one" not in INST but in 1TD of ATTCNT. Step 735 is programmed to disregard the first time delay in Pilot and make the 1TD shot instantaneous, and the subsequent two possible time delayed pilot shots use the time delays TD2 and TD3 established on the panel. Next in a step 745 the attempt counter is tested to determine whether the last permissible attempt has been executed, and if not operations proceed to step 731. If in either step 723 or step 745, the last permissible attempt has been executed, then operations branch from the respective step 723 or 745 to a step 747 where the REM count for unsuccessful recloses (Lockouts w/o DTL:TABL) is incremented. After step 747, point E and lockout step 663 of FIG. 16 is reached.

Operations can enter the Attempt routine of FIG. 18 from FIG. 15 directly at point C. For example, when power is restored in FIG. 3B with Reclose Initiate present and time left to run on a reclose timer, operations in FIG. 18 proceed from point C directly to the reclose time out loop with steps 737, 739 and 741. If there is reclose time out in step 737, operations exit through point D to FIG. 19.

Figure 19:
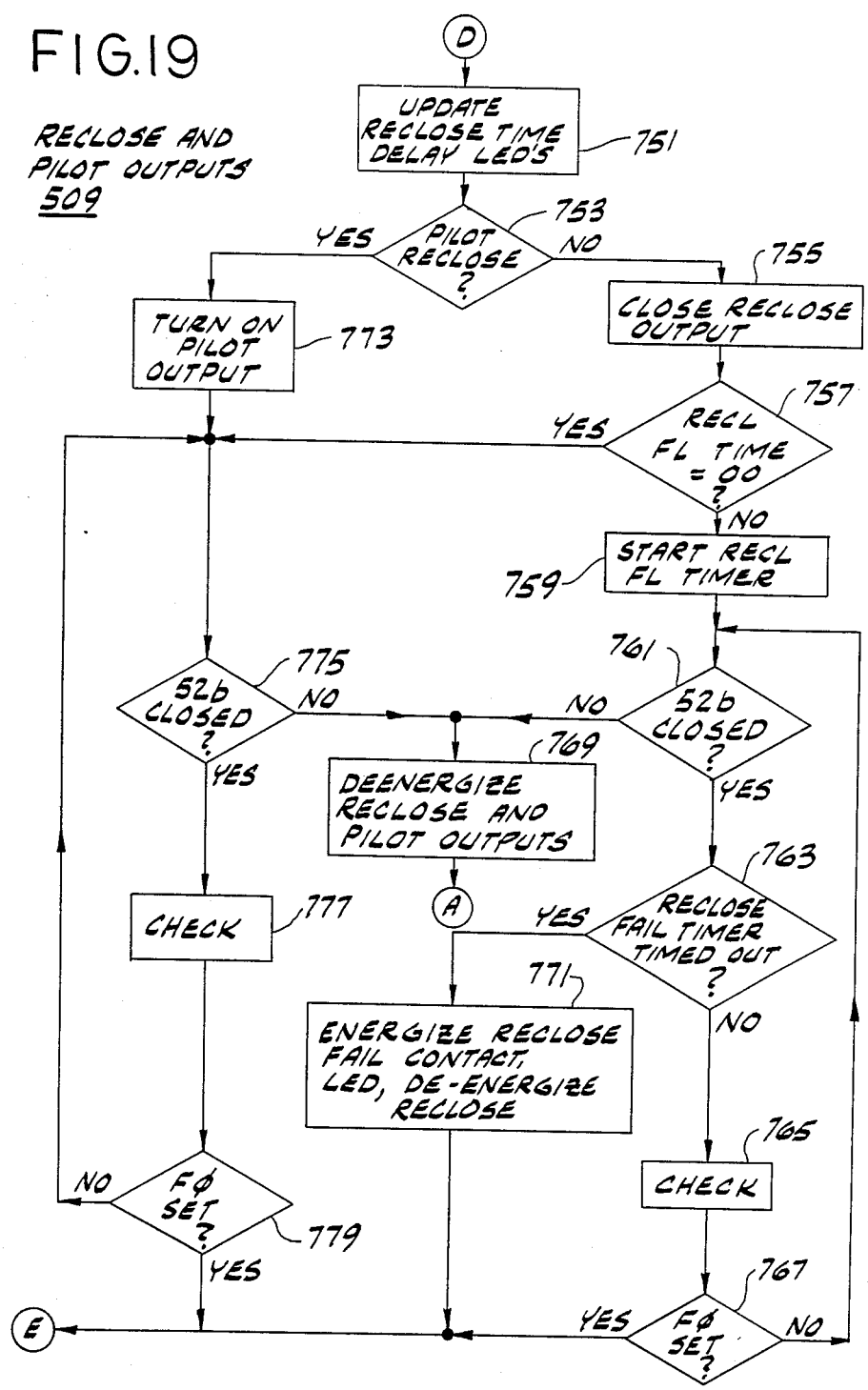
FIG. 19 is a flowchart of a Reclose and Pilot Outputs section of the main routine of FIG. 14.

In FIG. 19 operations at point D proceed to a step 751 where the pertinent reclose time delay LED 94, 111, 113 or 115 is lighted in addition to any of them which may already be lighted. Then a step 753 tests for pilot enable in LPSTAT. If there is no pilot enable, then operations proceed to a step 755 to close the reclose output contacts K1 and turn on reclose output LED 93. Then in a step 757, the Reclose Fail Time value derived from thumbwheels 103 is tested for "00". If not "00" then a step 759 starts the reclose fail timer by setting bit RF in byte TIMEN of FIG. 11. Then a step 761 tests 52b closed (CB open) and if 52b is still closed because CB has not actually closed yet in response to the reclosing command of step 755, then a step 763 tests for reclose fail timer timeout. If it is not timed out a loop is executed through check subroutine in a step 765 and a lockout flag test step 767 and back to step 761 until either the breaker closes (step 761) or the reclose fail timer times out (step 763) or there is a reason to go to lockout point E because of the lockout flag (step 767). If the breaker CB closes then a branch is made from step 761 to a step 769 to deenergize the reclose output K1 and LED 93 and the pilot output K7. Point A is now reached, and operations return to Reset Timing and Lockout routine of FIG. 16. However, if the Reclose Fail timer times out before the breaker CB closes, then a branch is made from step 763 to a step 771 to energize the reclose fail contact K3 and LED 101, and deenergize the reclose output K1 and LED 93 whereupon point E and lockout step 663 of FIG. 16 are reached.

If in step 753 of FIG. 19 there is a pilot enable PI IN=1 in LPSTAT, then the pilot output K7 and LED 135 are energized in a step 773 and operations proceed to a step 775 to test the state of the breaker CB. Also, if the Reclose Fail time thumbwheels 103 are "00" in step 757 a branch to step 775 is also made. If at such time, the breaker is closed (52b open) then a branch is made to step 769 to de-energize the reclose and pilot reclose outputs and to go back to Reset state FIG. 16. However, if the breaker is open (52b closed), then a loop is made through a check subroutine step 777 and a lockout flag F0 test 779 and back to step 775 in order to continue the reclose command either through the K1 or K7 contact as the case may be until the breaker finally closes or lockout is reached by other means from step 779.

Figure 20:
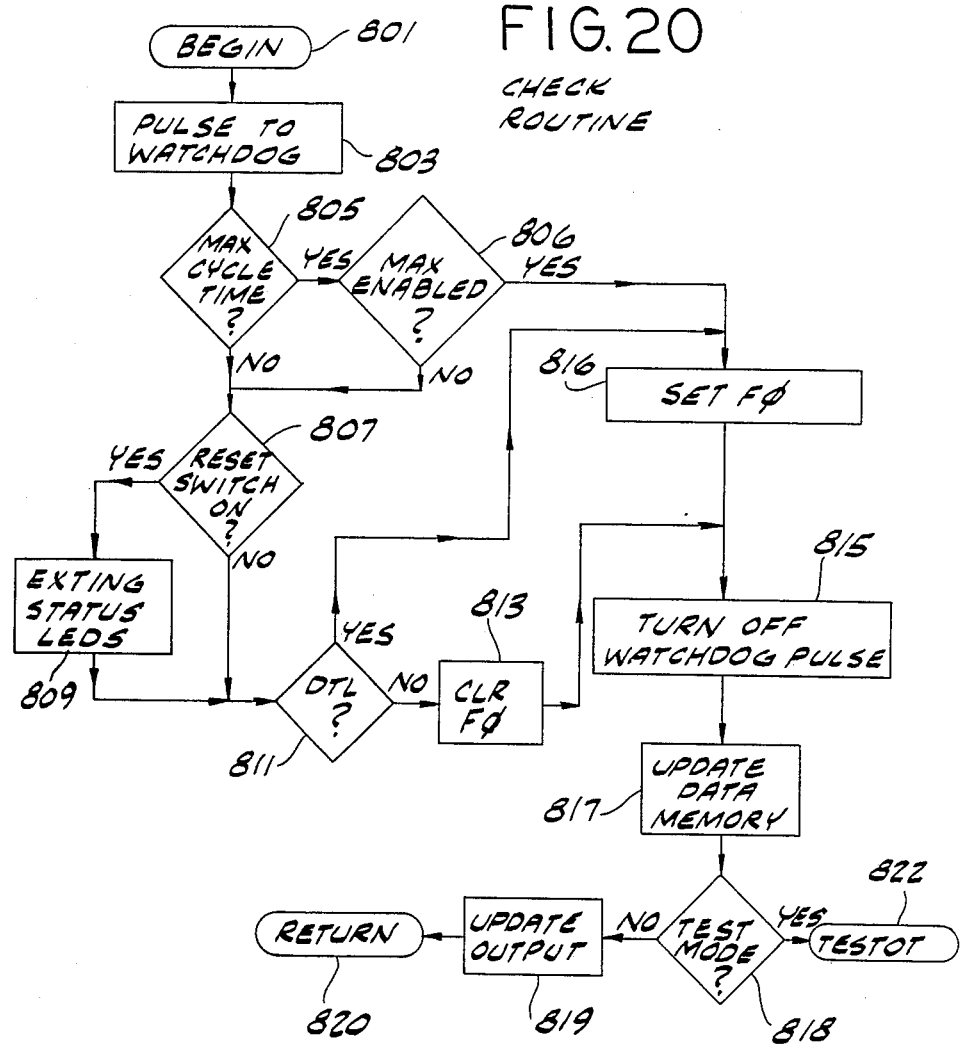
FIG. 20 is a flowchart of a Check Routine section in the flowcharts of FIGS. 16-19 involving an inventive maximum cycle time method.

In FIG. 20 operations in the Check Subroutine are detailed. They commence with a BEGIN 801 and go to a step 803 to supply a pulse on line P12 to watchdog and logic circuit 301. Then a test is a step 805 is made to determine whether the maximum cycle time set on thumbwheels 131 of FIG. 8 has been timed out. If maximum cycle time has not timed out in step 805, or if it has timed out but the max cycle time feature is not enabled as determined in a step 806, operations proceed to a decision step 807 that tests whether the Reset Switch 151 of FIG. 8 is on. If so, operations branch to a step 809 to extinguish the Status LEDs 94, 111, 113, 115 and 135 whereupon a decision step 811 is reached. If reset Switch 151 is not on in step 807, operations go directly to step 811 where a test is made for Drive to Lockout DTL. If there is no DTL, then the lockout flag F0 is cleared in a step 813 whereupon a step 815 is reached.

If there is DTL in step 811 or if the maximum cycle time has timed out and the max cycle time feature is enabled in step 806, operations branch to a step 816 to set the lockout flag F0. Next in step 815 the P12 output to watchdog circuit 301 is terminated to complete the pulse which was begun in step 803.

Then in a step 817 the outputs OUTLED and OUTCON are updated in the data memory of FIG. 11. A following step 818 determines whether TEST switch 141 is in a normal position or is selecting the TEST mode. If in normal position, operations proceed to a step 819 where the Max Cycle LED 133 is turned on if TDC=1 in TIMOUT and all other LED and contact outputs are updated, whence a RETURN 820 is reached.

In this way, microcomputer 201 supplies a lockout signal if the operations are not completed within a predetermined time period after the breaker is initially tripped, and the reclosing relay has means (e.g. thumbwheels 131) for establishing the predetermined time period for the microcomputer 201 independently of the reset time in the reclosing sequence.

Figure 21:
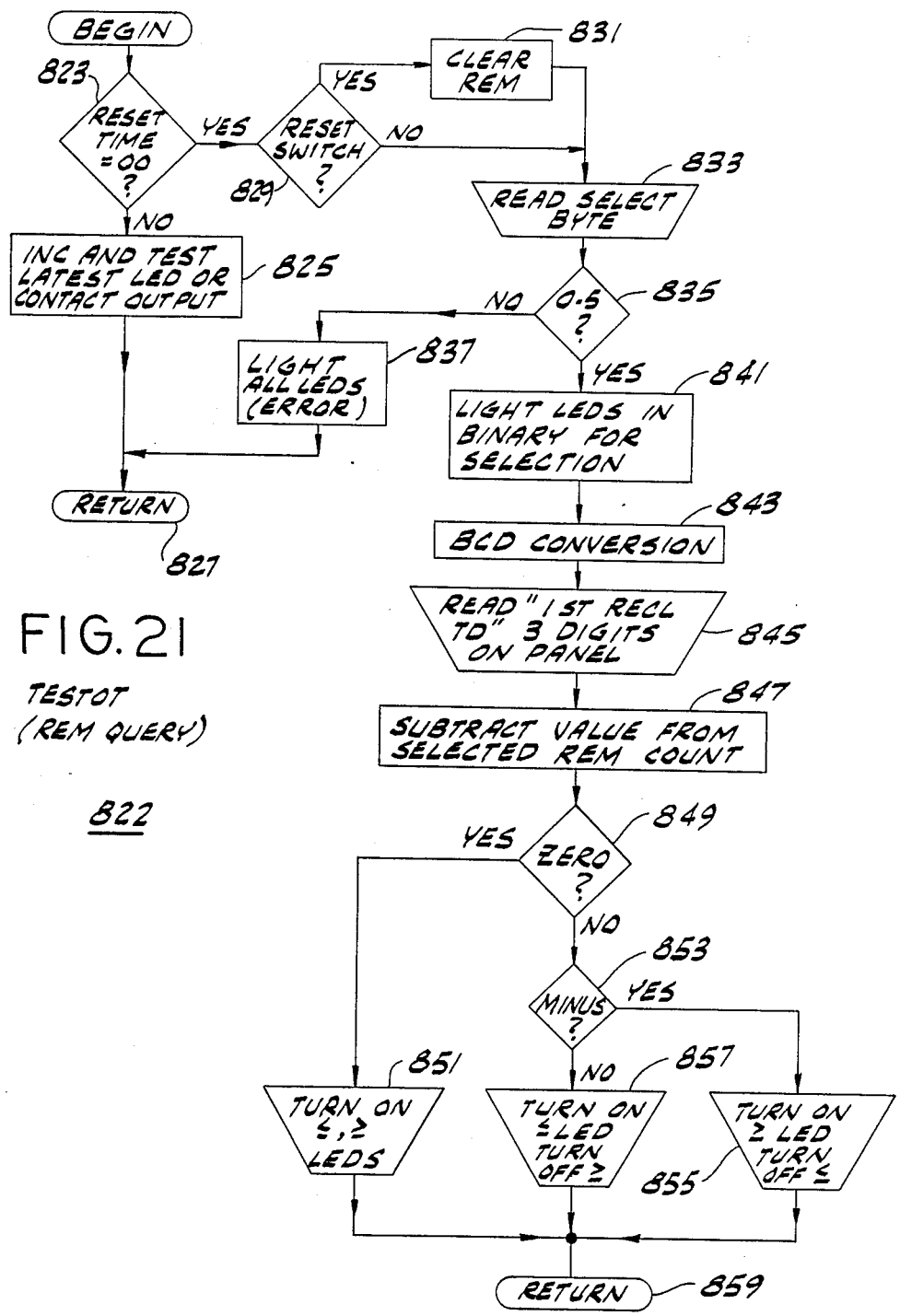
FIG. 21 is a flowchart of a TESTOT section of the Check Routine of FIG. 20 involving an inventive method of reading out data from REM.

If the TEST mode is selected by switch 141 in step 818, then a branch is made to the Test Output TESTOT routine 822 of FIG. 21 to query the REM values if thumbwheels 105 are set to "00" and otherwise to successively actuate all contacts and LEDs to determine whether they are properly operating.

In FIG. 21 operations in TESTOT routine 822 commence with a BEGIN and proceed to test in a step 823 whether the Reset Time on thumbwheels 105 is set to "00". If not, microcomputer 201 successively actuates all contacts and LEDs by incrementing through all of them at one second intervals in a step 825 whence a RETURN 827 is reached.

If the thumbwheels 105 are set to "00" in step 823, then operations branch to test the Reset Switch 151 in a step 829. If this switch is set to Reset then the accumulated data in REM of FIG. 9 is cleared in a step 831 and a step 833 is reached. If the switch 151 is not set to Reset, then the accumulated date in REM is preserved and operations proceed directly to step 833 where the numeral selected by operator on thumbwheel 145 of FIG. 8 is read. If this numeral is not in the set of numbers 0 through 5 in a testing step 835, operations branch to a step 837 to light all of the LEDs to indicate error, whereupon RETURN 827 is reached. However, if the numeral is 0-5 in step 835, operations proceed to a step 841 to light LEDs 94, 111 and 113 with a binary number representing the selection 0, 1, 2, 3, 4 or 5 on thumbwheel 145 as discussed hereinabove in connection with Table I.

Next in a step 843, the number in the selected REM count is converted to BCD form for comparison with the numerals on thumbwheels 109 of FIG. 8. Next in a step 845, the 3 BCD digits of thumbwheels 109 are read, and in a step 847, they are subtracted from the selected REM count. Afterwards, a test is made in a step 849 to compare the resulting difference with zero. If the difference is zero, then operations branch to an output step 851 to turn on both LEDs 115 and 91 to indicate that the thumbwheels 109 show the selected REM count which can thereupon be read as such by operator. If the difference is not zero in step 849, then operations proceed to test whether the difference is negative in a step 853. If so, LED 91 is turned on and LED 115 is turned off in a step 855. This means that the thumbwheels 109 value is at least equal to the stored REM count and indeed greater than it. If the difference is not negative is step 853, then LED 91 is turned off and LED 115 is turned on in a step 857, meaning that the thumbwheels 109 value is at most equal to the stored REM count and indeed less than it. Operations go to a RETURN 859 after each of steps 851, 855 and 857.

Thumbwheels 109 constitute means for adjustably establishing and indicating a time interval between operations in the reclosing sequence. Examples of first and second indicator means and means for selecting a test mode are LEDs 115 and 91 and switch 141. As discussed above, microcomputer 201 also constitutes means generally operable when the test mode is selected for respectively activating said first and second indicator means depending on whether a number, indicated by the means for adjustably establishing and indicating, is at least or at most equal to the running count. The reclosing relay further has thumbwheel 145 which constitutes second means for adjustably establishing and indicating a selection from the respective running counts to be indicated by the first means in the test mode. LEDs 94, 111 and 113 acts as third indicator means connected to the electronic means for verifying what selection from the respective running counts has been received from said second means for adjustably establishing and indicating in the test mode.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A reclosing relay for use in an electrical power system subject to loss of power, the power system having a circuit breaker for clearing line faults by tripping and reclosing, the breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated; and electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one or more operations, means for storing information in the nonvolatile memory response to the generation of the second signal, when a loss of power is anticipated and before power is lost to the electronic means, thereby identifying which operation in the reclosing sequence is currently being executed, wherein an operation in the reclosing sequence comprises timing a predetermined time interval and said means for storing also includes means responsive to an occurrence of the second signal for storing a value in the nonvolatile memory representing a time period remaining in the predetermined time interval when the interval is being timed and the second signal occurs, and means responsive to the first signal for using the stored information from the nonvolatile memory to continue in the reclosing sequence from the identified operation upon restoration of power after the power loss.

2. A reclosing relay as set forth in claim 1 wherein said electronic means also includes means responsive to the means for producing the first signal when the power is restored for continuing from the identified operation in the reclosing sequence by resuming with the same operation during which the second signal occurred if the breaker has not changed state since the occurrence of the second signal.

3. A reclosing relay as set forth in claim 1 wherein said electronic means also includes means responsive to the means for producing the first signal when the power is restored for continuing in the reclosing sequence by immediately proceeding to an operation subsequent to the identified operation if the breaker has changed state since the occurrence of the second signal.

4. A reclosing relay as set forth in claim 1 wherein said electronic means also includes means for producing and storing data representing a reclosing relay condition, a reclosing sequence enabled condition and a lockout condition.

5. A reclosing relay as set forth in claim 1 wherein said electronic means also includes means for producing and storing data representing a reclosing relay reset condition, a reclosing sequence enabled condition and a lockout condition, and when operations are in a reclosing sequence enabled condition also producing and storing data representing whether operations are in an instantaneous reclose attempt condition or a time delayed reclose attempt condition.

6. A reclosing relay as set forth in claim 1 wherein said electronic means also includes means for producing and storing data representing the current state of the circuit breaker.

7. A reclosing relay as set forth in claim 1 wherein said electronic means also includes means for detecting an inconsistency in the stored information in the nonvolatile memory and means for preventing the use of the stored information in the nonvolatile memory if the inconsistency is detected.

8. A reclosing relay as set forth in claim 1 wherein said electronic means also includes means responsive to an occurrence of the second signal for storing a datum in the nonvolatile memory representing occurrence of a power interruption, and means for utilizing the stored information from the nonvolatile memory identifying which operation in the reclosing sequence was currently being executed to continue in the reclosing sequence upon restoration of power only if the stored datum is also present in the nonvolatile memory.

9. A reclosing relay as set forth in claim 1 wherein the predetermined time interval is a reclose time delay.

10. A reclosing relay as set forth in claim 1 wherein the predetermined time interval is a reset time interval after reclosure.

11. A reclosing relay as set forth in claim 1 wherein the predetermined time interval is a maximum cycle time for the reclosing relay.

12. A reclosing relay as set forth in claim 1 wherein the predetermined time interval is a reclose fail time.

13. A reclosing relay as set forth in claim 1 wherein said electronic means includes means for supplying a lockout signal after a predetermined number of reclose commands have been supplied and the circuit breaker still reopens within a predetermined reset time interval after the last reclose command, means for storing lockout information in the nonvolatile memory when the lockout signal and the second signal are both present, and means for using the lockout information stored in the nonvolatile memory to supply the lockout signal upon restoration of power if the first signal indicates that the breaker is open.

14. A reclosing relay as set forth in claim 1 wherein said electronic means comprises a microcomputer and said means for supplying, means for storing and means for using are integral to the microcomputer.

15. A reclosing relay for use in an electrical power system subject to loss of power, the power system having a circuit breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated; and electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one or more operations, means for storing information in the nonvolatile memory in response to the generation of the second signal, when a loss of power is anticipated and before power is lost to the electronic means, thereby identifying which operation in the reclosing sequence is currently being executed, and means responsive to the first signal for using the stored information from the nonvolatile memory to continue in the reclosing sequence from the identified operation upon restoration of power after the power loss;

the reclosing relay further comprising distinct reclose and pilot reclose output contacts, the reclose output contacts being actuated in response to the reclose command, wherein said electronic means also includes means having separate inputs for reclose initiation and pilot reclose initiation for storing data in response to the input for pilot reclose initiation representing whether a pilot relaying sequence is in progress and means for producing a first pilot reclose command for the breaker through the pilot reclose output contacts when the data represents a pilot relaying sequence in progress.

16. A reclosing relay for use in an electrical power system subject to loss of power, the power system having a circuit breaker for clearing line faults by tripping and reclosing, the breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated;

electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one or more operations, means for storing information in the nonvolatile memory in response to the generation of the second signal, when a loss of power is anticipated and before power is lost to the electronic means, thereby identifying which operation in the reclosing sequence is currently being executed, and means responsive to the first signal for using the stored information from the nonvolatile memory to continue in the reclosing sequence from the identified operation upon restoration of power after the power loss; and means for selectively enabling and disabling said electronic means from using the information identifying which operation in the reclosing sequence is currently being executed when a loss of power is anticipated.

17. A reclosing relay as set forth in claim 1 wherein said electronic means also includes means responsive to an occurrence of the second signal for storing a datum in the nonvolatile memory representing occurrence of a power interruption, and means for utilizing the stored information from the nonvolatile memory identifying which operation in the reclosing sequence was currently being executed to continue in the reclosing sequence upon restoration of power only if the stored datum is also present in the nonvolatile memory.

18. A reclosing relay for use in an electrical power system subject to loss of power, the power system having a circuit breaker for clearing line faults by tripping and reclosing, the breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated; and electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one or more operations, means for storing information in the nonvolatile memory in response to the generation of the second signal, when a loss of power is anticipated and before power is lost to the electronic means, thereby identifying which operation in the reclosing sequence is currently being executed, means responsive to the first signal for using the stored information from the nonvolatile memory to continue in the reclosing sequence from the identified operation upon restoration of power after the power loss, and means generally operable after the restoration of power for compensating in the reclosing operations for a change in state of the circuit breaker that occurs after the loss of power and before the restoration of power.

19. A reclosing relay as set forth in claim 18 wherein said electronic means includes means for producing pulses indicative of proper functioning of said electronic means and the reclosing relay further comprises means for generating a third signal upon a cessation of said pulses.

20. A reclosing relay as set forth in claim 18 wherein said electronic means includes means for supplying the reclose command for the breaker when the breaker is open by selectively bypassing or executing an instantaneous reclose attempt and at least one time delayed reclose attempt and the reclosing relay further comprises means for selectively causing said electronic means to bypass the instantaneous reclose attempt.

21. A reclosing relay as set forth in claim 18 wherein the operations in the reclosing sequence include an instantaneous reclosure and one or more time delayed reclosures, and said electronic means includes means for storing in nonvolatile form respective running counts to specify corresponding numbers of occurrences over time of the instantaneous reclosure and each time delayed reclosure in the reclosing sequence.

22. A reclosing relay as set forth in claim 18 wherein said electronic means includes means for storing in nonvolatile form a running count of the number of occurrences over time of lockout resulting from unsuccessful reclosures.

23. A reclosing relay for use in an electrical power system with a circuit breaker for clearing line faults by tripping and reclosing, the breaker having auxiliary contacts defining the state of the circuit breaker as open or closed, the reclosing relay comprising:

means responsive to the auxiliary contacts for producing a first signal representative of the state of the breaker;

means for generating a second signal when a loss of power to the reclosing relay is anticipated; and electronic means connected to the means for producing the first signal and to said means for generating the second signal including means for supplying a reclose command for the breaker when the breaker is open by executing one or more operations in a predetermined reclosing sequence wherein the operation in the reclosing sequence include an instantaneous reclosure and one or more time delayed reclosures, and means for producing respective running counts to specify corresponding numbers of occurrences over time of the instantaneous reclosure and each time delayed reclosure in the reclosing sequence as they occur and storing in nonvolatile form the running counts specifying the numbers of occurrences of the instantaneous reclosure and each time delayed reclosure.

24. A reclosing relay as set forth in claim 23 wherein said electronic means includes means for supplying a pilot reclose command for the breaker separate from the first-named reclose command for the breaker and means for storing a running count in nonvolatile form specifying the number of occurrences of the pilot reclose command.

25. A reclosing relay as set forth in claim 23 wherein said electronic means includes means for supplying a lockout signal after a predetermined series of the operations, and means for storing a running count in nonvolatile form specifying the number of occurrences over time of the lockout signal.

26. A reclosing relay as set forth in claim 23 further comprising means for adjustably establishing and indicating a time interval between operations in the reclosing sequence.

27. A reclosing relay as set forth in claim 26 further comprising first and second indicators, wherein said electronic means includes means for activating said first indicator depending on whether the reclosing sequence is in progress and means for activating said second indicator to indicate the point reached in the sequence.

28. A reclosing relay as set forth in claim 23 wherein the reclosing sequence includes a reset time and said electronic means includes means for supplying a lockout signal if the operations are not completed within a predetermined time period after the breaker is initially tripped, the reclosing relay further comprising means for establishing the predetermined time period for the electronic means independently of the reset time in the reclosing sequence.

29. A reclosing relay as set forth in claim 23 wherein said electronic means is subject itself to the loss of power to the reclosing relay and includes means for storing information in the nonvolatile memory in response to the generation of the second signal, when a loss of power is anticipated and before power is lost to the electronic means, thereby identifying which operation in the reclosing sequence is currently being executed, and means responsive to the first signal for using the stored information from the nonvolatile memory to continue in the reclosing sequence from the identified operation upon restoration of power after the power loss.

30. A reclosing relay as set forth in claim 23 wherein an operation in the reclosing sequence comprises timing a predetermined time interval and said electronic means is subject itself to the loss of power to the reclosing relay and includes means for storing information in the nonvolatile memory in response to the generation of the second signal, when a loss of power is anticipated and before power is lost to the electronic means, thereby identifying which operation in the reclosing sequence is currently being executed and storing a value in the nonvolatile memory representing a time period remaining in the predetermined time interval when the interval is being timed and the second signal occurs, and means responsive to the first signal for using the stored information from the nonvolatile memory to continue in the reclosing sequence from the identified operation upon restoration of power after the power loss.

31. A reclosing relay for use in an electrical power system with a circuit breaker for clearing line faults by tripping and reclosing, the breaker having auxiliary contacts defining the state of the circuit breaker as open or closed, the reclosing relay comprising:
    means responsive to the auxiliary contacts for producing a first signal representative of the state of the breaker;
    means for generating a second signal when a loss of power to the reclosing relay is anticipated; and
    electronic means connected to the means for producing the first signal and to said means for generating the second signal including means for supplying a reclose command for the breaker when the breaker is open by executing one or more operations in a predetermined reclosing sequence wherein the operations in the reclosing sequence include an instantaneous reclosure and one or more time delayed reclosures, and means for storing in nonvolatile form respective running counts to specify corresponding numbers of occurrences over time of the instantaneous reclosure and each time delayed reclosure in the reclosing sequence, wherein said electronic means also includes means for supplying a lockout signal after a predetermined number of reclose commands have been supplied and the circuit breaker still reopens within a predetermined reset time interval after the last reclose command, means for also supplying a lockout signal in response to an externally derived drive to lockout (DTL) signal, and means for storing a running count in nonvolatile form specifying the number of occurrences of the lockout signal excluding occurrences of the lockout signal responsive to the DTL signal.

32. A reclosing relay for use in an electrical power system with a circuit breaker for clearing line faults by tripping and reclosing, the breaker having auxiliary contacts defining the state of the circuit breaker as open or closed, the reclosing relay comprising:
    means responsive to the auxiliary contacts for producing a first signal representative of the state of the breaker;
    means for generating a second signal when a loss of power to the reclosing relay is anticipated;
    electronic means connected to the means for producing the first signal and to said means for generating the second signal including means for supplying a reclose command for the breaker when the breaker is open by executing one or more operations in a predetermined reclosing sequence wherein the operations in the reclosing sequence include an instantaneous reclosure and one or more time delayed reclosures, and means for storing in nonvolatile form respective running counts to specify corresponding numbers of occurrences over time of the instantaneous reclosure and each time delayed reclosure in the reclosing sequence;
    means for adjustably establishing and indicating a time interval between operations in the reclosing sequence; and
    first and second indicators and means for selecting a test mode, wherein said electronic means includes means generally operable when said test mode is selected for activating said first or said second indicator depending on whether a number, indicated by the means for adjustably establishing and indicating, is respectively at most equal or at least equal to one of the running counts.

33. A reclosing relay as set forth in claim 32 further comprising second means for adjustably establishing and indicating a selection from the respective running counts in the test mode.

34. A reclosing relay as set forth in claim 33 further comprising third indicator means connected to said electronic means for verifying what selection from the respective running counts has been received from said second means for adjustably establishing and indicating in the test mode.

35. A reclosing relay for use in an electrical power system with a circuit breaker for clearing line faults by tripping and reclosing, the breaker having auxiliary contacts defining the state of the circuit breaker as open or closed, the reclosing relay comprising:
    means responsive to the auxiliary contacts for producing a first signal representative of the state of the breaker;
    means for generating a second signal when a loss of power to the reclosing relay is anticipated; and
    electronic means connected to the means for producing the first signal and to said means for generating the second signal including means for supplying a reclose command for the breaker when the breaker is open by executing one or more operations in a predetermined reclosing sequence wherein the operations in the reclosing sequence include an instantaneous reclosure and one or more time delayed reclosures, and means for storing in nonvolatile form respective running counts to specify corresponding numbers of occurrences over time of the instantaneous reclosure and each time delayed reclosure in the reclosing sequence, the reclosing relay further comprising distinct reclose and pilot reclose output contacts, the reclose output contacts being actuated in response to the reclose command, wherein said electronic means also includes means having separate inputs for reclose initiation and pilot reclose initiation for producing a pilot reclose command for the breaker through the pilot reclose output contacts in response to the input for pilot reclose initiation and means for storing an additional running count in nonvolatile form to specify a corresponding number of occurrences over time of the pilot reclose command.

36. A reclosing relay for use in an electrical power system with a circuit breaker for clearing line faults by tripping and reclosing, the breaker having auxiliary contacts defining the state of the circuit breaker as open or closed, the relay comprising:
- means responsive to the auxiliary contacts for producing a first signal representative of the state of the breaker;
- electronic means connected to said first signal producing means for supplying a reclose command for the breaker when the breaker is open by executing one or more operations in a reclosing sequence having a time delay and for supplying a lockout signal if the operations are not completed within a predetermined time period after the breaker is initially tripped; and
- means for establishing the predetermined time period for the electronic means independently of the time delay in the reclosing sequence.

37. A method of operating a reclosing relay for use in an electrical power system and subject to loss of power from the power system, the power system having a circuit breaker for clearing line faults by tripping and reclosing, the breaker having auxiliary contacts defining the state of the circuit breaker as open or closed, the method comprising the steps of:
- electronically supplying a reclose command for the breaker when the breaker is open by executing a predetermined reclosing sequence of one of more operations;
- generating a signal when a loss of power from the electrical power system to the reclosing relay is anticipated;
- responding to the signal when a loss of power from the electrical power system to the reclosing relay is anticipated, and before power to complete the responding step is lost, to store information in a nonvolatile memory identifying which operation in the reclosing sequence is currently being executed, wherein an operation in the reclosing sequence comprises timing a predetermined time interval, and the responding step includes storing a value representing a time period remaining in the predetermined time interval when the interval is being timed and the signal occurs; and
- using the stored information from the nonvolatile memory to electronically continue in the reclosing sequence from the identified operation upon restoration of power after the power loss.

38. A method of operating a reclosing relay for use in an electrical power system with a circuit breaker for clearing line faults by tripping and reclosing, the breaker having auxiliary contacts defining the state of the circuit breaker as open or closed, the method comprising the steps of:
- electronically supplying a reclose command for the breaker when the breaker is open by executing one or more operations in a predetermined reclosing sequence wherein the operations in the reclosing sequence include an instantaneous reclosure and one or more time delayed reclosures;
- electronically producing respective running counts to specify corresponding numbers of occurrences over time of the instantaneous reclosure and each time delayed reclosure in the reclosing sequence as they occur; and
- storing in nonvolatile form the running counts specifying the numbers of occurrences of the instantaneous reclosure and each time delayed reclosure.

39. A method of operating a reclosing relay for use in an electrical power system with a circuit breaker for clearing line faults by tripping and reclosing, the breaker having auxiliary contacts defining the state of the circuit breaker as open or closed, the reclosing relay including first and second indicators and means for adjustably establishing and indicating a time interval between operations of a reclosing sequence, the method comprising the steps of:
- electronically supplying a reclose command for the breaker when the breaker is open by executing one or more of the operations in the reclosing sequence wherein the operations in the reclosing sequence include an instantaneous reclosure and one or more time delayed reclosures;
- electronically counting the number of occurrences over time of a particular operation in the reclosing sequence; and
- activating said first indicator or said second indicator in a test mode depending on whether a number, indicated by the means for adjustably establishing and indicating, is respectively at least or at most equal to the number of occurrences of the particular operation electronically counted.

40. A method of operating a reclosing relay for use in an electrical power system with a circuit breaker for clearing line faults by tripping and reclosing, the breaker having auxiliary contacts defining the state of the circuit breaker as open or closed, the method comprising the steps of:
- electronically supplying a reclose command for the breaker when the breaker is open by executing one or more operations in a reclosing sequence having a time delay;
- electronically supplying a lockout signal if the operations are not completed within a predetermined time period after the breaker is initially tripped; and
- electronically establishing the predetermined time period independently of the time delay in the reclosing sequence.

41. A reclosing relay for use in an electrical power system subject to loss of power, the power system having a circuit breaker for clearing line faults by tripping and reclosing, the breaker having auxiliary contacts defining the state of the circuit breaker as open or closed, the reclosing relay comprising:
- means responsive to the auxiliary contacts for producing a first signal representative of the state of the breaker;
- a nonvolatile memory;
- means for generating a second signal when a loss of power from the electrical power system to the reclosing relay is anticipated; and
- electronic means, subject itself to the loss of power from the electrical power system to the reclosing relay and connected to the means for producing the first signal and to said means for generating the second signal, including; means responsive to the first signal for supplying a reclose command for the breaker when the breaker is open by executing a predetermined reclosing sequence of one or more operations, means for storing information in the nonvolatile memory in response to the generation of the second signal, when a loss of power is anticipated and before power is lost to the electronic means, thereby identifying which operation in the reclosing sequence is currently being executed, and means responsive to the first signal for using the stored information from the nonvolatile memory to continue in the reclosing sequence from the identified operation upon restoration of power after the power loss, wherein the reclosing sequence includes a reset time and said electronic means includes means for supplying a lockout signal if the operations are not completed within a predetermined time period after the breaker is initially tripped, the reclosing relay further comprising means for establishing the predetermined time period for the electronic means independently of the reset time in the reclosing sequence.

42. A reclosing relay for use in an electrical power system subject to loss of power, the power system having a circuit breaker for clearing line faults by tripping and reclosing, the breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated; and electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one or more operations, means for storing information in the nonvolatile memory in response to the generation of the second signal, when a loss of power is anticipated and before power is lost to the electronic means, thereby identifying which operations in the reclosing sequence is currently being executed, and means responsive to the first signal for using the stored information from the nonvolatile memory to continue in the reclosing sequence from the identified operation upon restoration of power after the power loss, wherein an operation in the reclosing sequence comprises timing a reset time interval and said electronic means also includes means responsive to the means for producing the first signal, after the reclose command is supplied and the first signal indicates breaker closed, for storing a value in the nonvolatile memory representing a time period remaining in the reset time interval when the reset time interval is being timed and the second signal occurs, and means for compensating in the reclosing operations for a change in state of the circuit breaker from closed to open that occurs after the loss of power to the electronic means and before the restoration of power by operating after the restoration of power if the first signal after restoration of power indicates breaker open to begin timing a reclose time delay in the reclosing sequence.

43. A reclosing relay for use in an electrical power system subject to loss of power, the power system having a circuit breaker for clearing line faults by tripping and reclosing, the breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated; and electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one or more operations, means for storing information in the nonvolatile memory in response to the generation of the second signal, when a loss of power is anticipated and before power is lost to the electronic means, thereby identifying which operation in the reclosing sequence is currently being executed, and means responsive to the first signal for using the stored information from the nonvolatile memory to continue in the reclosing sequence from the identified operation upon restoration of power after the power loss, wherein an operation in the reclosing sequence comprises timing a reset time interval and said electronic means has an input for a reclose initiation signal and also includes means responsive to the means for producing the first signal, after a reclose command is supplied by the electronic means and the first signal indicates breaker closed, for timing the reset time interval and upon an occurrence of the second signal storing a value in the nonvolatile memory representing a time period remaining in the reset time interval, and means for compensating in the reclosing operations for a change in state of the circuit breaker from closed to open that occurs after the loss of power and before the restoration of power by operating when the first signal indicates breaker open after restoration of power and the reset time interval has a time period remaining in the nonvolatile memory and the reclose initiation signal is present after the restoration of power to begin timing a reclose time delay in the reclosing sequence, and means for producing a lockout signal instead in response to the change in state of the circuit breaker from closed to open when there is no reclose initiation signal after the restoration of power.

44. A reclosing relay for use in an electrical power system subject to loss of power, the power system having a circuit breaker for clearing line faults by tripping and reclosing, the breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated; and electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one of more operations, means for storing information in the nonvolatile memory in response to the generation of the second signal, when a loss of power is anticipated and before power is lost to the electronic means, thereby identifying which operation in the reclosing sequence is currently being executed, and means responsive to the first signal for using the stored information from the nonvolatile memory to continue in the reclosing sequence from the identified operation upon restoration of power after the power loss, wherein the reclosing sequence has operations including timing a reclose time delay and said electronic means also includes responsive to the means for producing the first signal after a reclose when the first signal indicates breaker tripped open for timing a reclose time delay and upon an occurrence of the second signal storing a value in the nonvolatile memory representing a time period remaining in the reclose time delay, and means for compensating in the reclosing operations for a change in state of the circuit breaker from open to closed that occurs after the loss of power and before the restoration of power by operating after the restoration of power if the first signal after restoration of power indicates breaker closed to thereupon begin timing a reset time for the reclosing relay.

45. A reclosing relay for use in an electrical power system subject to loss of power, the power system having a circuit breaker for clearing line faults by tripping and closing, the breaker having auxiliary contacts defining the state of the circuit breaker as open or closed, the reclosing relay comprising:

means responsive to the auxiliary contacts for producing a first signal representative of the state of the breaker;

a nonvolatile memory;

means for generating a second signal when a loss of power from the electrical power system to the reclosing relay is anticipated; and electronic means, subject itself to the loss of power from the electrical power system to the reclosing relay and connected to the means for producing the first signal and to said means for generating the second signal, including: means responsive to the first signal for supplying a reclose command for the breaker when the breaker is open by executing a predetermined reclosing sequence of one or more operations, means for storing information in the nonvolatile memory in response to the generation of the second signal, when a loss of power is anticipated and before power is lost to the electronic means, thereby identifying which operation in the reclosing sequence is currently being executed, and storing a datum in the nonvolatile memory representing occurrence of a power interruption, and means responsive to the first signal for using the stored information from the nonvolatile memory identifying which operation in the reclosing sequence was currently being executed to continue in the reclosing sequence from the identified operation when the stored datum is also present in the nonvolatile memory upon restoration of power after the power loss, and disabling the use of the stored information when the stored datum is absent from the nonvolatile memory upon restoration of power after the power loss.

* * * * *

UNITED STATES PATENT AND TRADEMARK OFFICE
CERTIFICATE OF CORRECTION

PATENT NO. : 4,845,594

DATED : July 4, 1989

INVENTOR(S) : Timothy M. Wilkerson

It is certified that error appears in the above-identified patent and that said Letters Patent is hereby corrected as shown below:

Column 30, line 27, "memory response", should read ---memory in response---.

Column 30, line 61-62, "relay condition", should read ---relay reset condition---.

Column 31, line 53, "breaker having", should read ---breaker for clearing line faults by tripping and reclosing, the breaker having---.

Column 41, line 37, "and closing", should read ---and reclosing---.

Signed and Sealed this

Twelfth Day of March, 1991

Attest:

HARRY F. MANBECK, JR.

*Attesting Officer*      *Commissioner of Patents and Trademarks*